(12) United States Patent
Remmel et al.

(10) Patent No.: US 8,240,741 B2
(45) Date of Patent: Aug. 14, 2012

(54) COVERING FRAME FOR A TARPAULIN STRUCTURE

(75) Inventors: Lars Remmel, Remscheld (DE); Marion Heynen, Dusseldorf (DE); Karl Kemmerling, Solingen (DE)

(73) Assignee: VBG Group Truck Equipment GmbH (DE)

( * ) Notice: Subject to any disclaimer, the term of this patent is extended or adjusted under 35 U.S.C. 154(b) by 817 days.

(21) Appl. No.: 11/918,117

(22) PCT Filed: Apr. 7, 2006

(86) PCT No.: PCT/DE2006/000615
§ 371 (c)(1),
(2), (4) Date: Jan. 16, 2009

(87) PCT Pub. No.: WO2006/105779
PCT Pub. Date: Oct. 12, 2006

(65) Prior Publication Data
US 2009/0121514 A1    May 14, 2009

(30) Foreign Application Priority Data

| Apr. 7, 2005 | (DE) | 10 2005 016 158 |
| Jun. 19, 2005 | (DE) | 10 2005 028 538 |
| Nov. 16, 2005 | (DE) | 10 2005 054 488 |

(51) Int. Cl.
*B60P 7/04* (2006.01)
(52) U.S. Cl. .......... 296/100.12; 296/100.15; 296/100.16
(58) Field of Classification Search .................... 296/98, 296/100.11–100.18, 136.1–136.13
See application file for complete search history.

(56) References Cited

U.S. PATENT DOCUMENTS

| 3,820,840 | A | * | 6/1974 | Forsberg | 296/100.12 |
| 3,979,782 | A | * | 9/1976 | Lamb | 4/502 |
| 5,636,893 | A | * | 6/1997 | Wheatley et al. | 296/100.07 |
| 6,561,564 | B1 | * | 5/2003 | Fliege et al. | 296/100.12 |
| 6,676,189 | B2 | * | 1/2004 | Schall et al. | 296/100.12 |
| 7,004,530 | B2 | * | 2/2006 | Marx et al. | 296/100.12 |
| 2002/0113456 | A1 | * | 8/2002 | Schall et al. | 296/100.11 |
| 2009/0121514 | A1 | * | 5/2009 | Remmel et al. | 296/100.12 |

FOREIGN PATENT DOCUMENTS

| DE | 33 27 755 | 1/1983 |
| DE | 41 36 257 | 4/1991 |
| DE | 196 28 433 | 7/1996 |
| EP | 0 835 799 | 8/1997 |
| EP | 0 778 169 | 2/2000 |
| EP | 1122108 | 8/2001 |
| EP | 1 205 325 | 10/2001 |

* cited by examiner

*Primary Examiner* — Glenn Dayoan
*Assistant Examiner* — Gregory Blankenship
(74) *Attorney, Agent, or Firm* — Ryan Kromholz & Manion, S.C.

(57) ABSTRACT

The invention relates to a covering frame for a tarpaulin structure, comprising a number of bows, which can be displaced along lateral longitudinal beams (4) and which each have a slide (6) at the ends thereof. Folding means (9) for force-folding a tarpaulin are provided in the vicinity of the slides (6). The invention also relates to a slide (6). A reliable and cost-effective assembly is achieved by virtue of the fact that the folding means (9) can be inserted into a guide (62*a*) of the slide (6) along the axis of the guide (62*a*). In addition, a profile of a longitudinal beam (4) for use in a covering frame is provided in order to guide a slide (6).

39 Claims, 27 Drawing Sheets

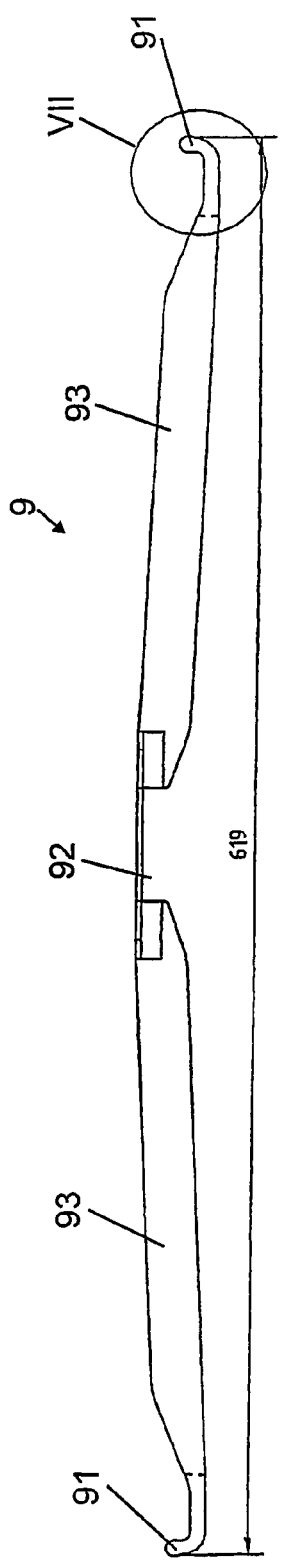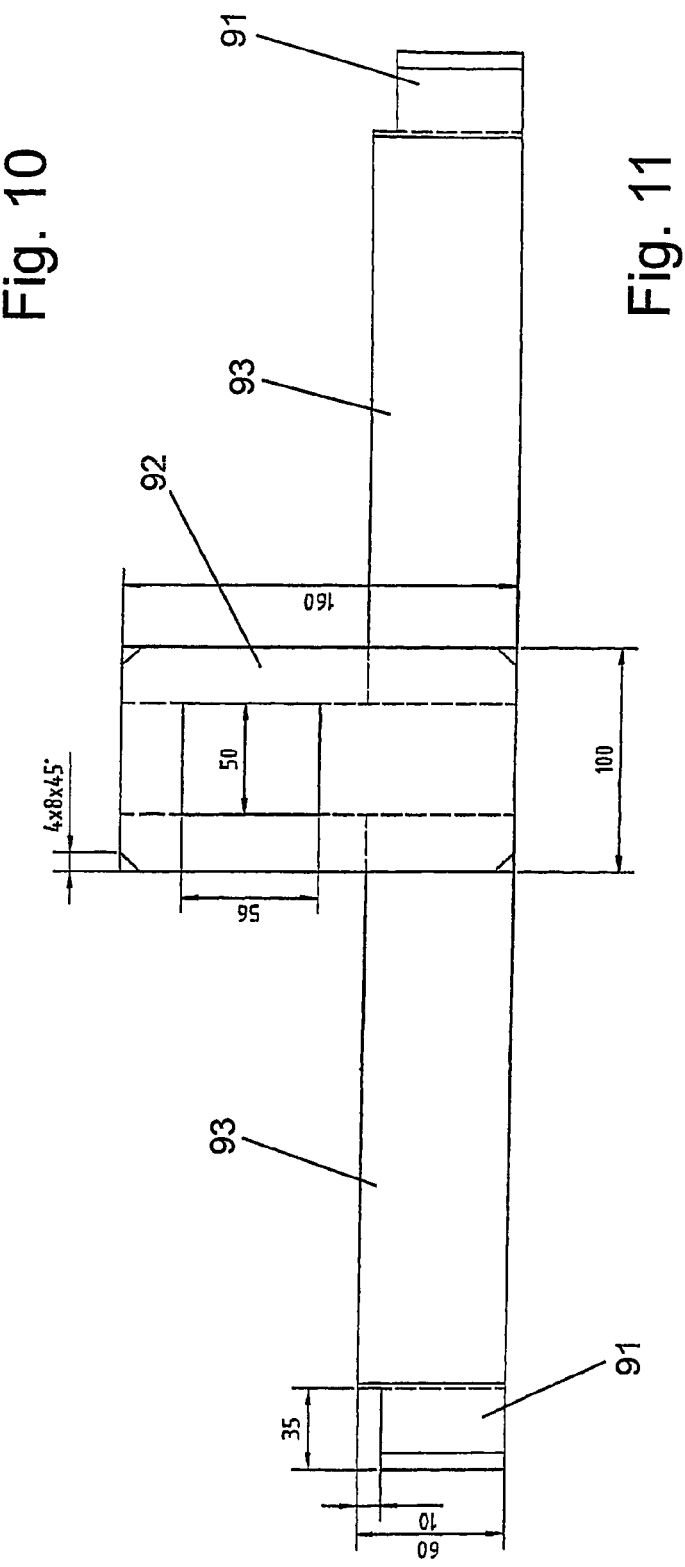
Fig. 10
Fig. 11

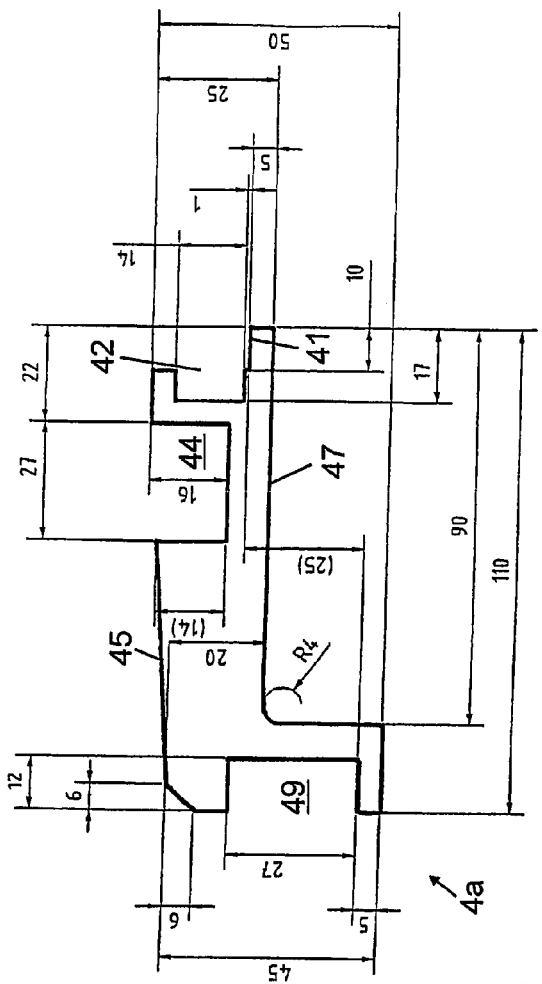
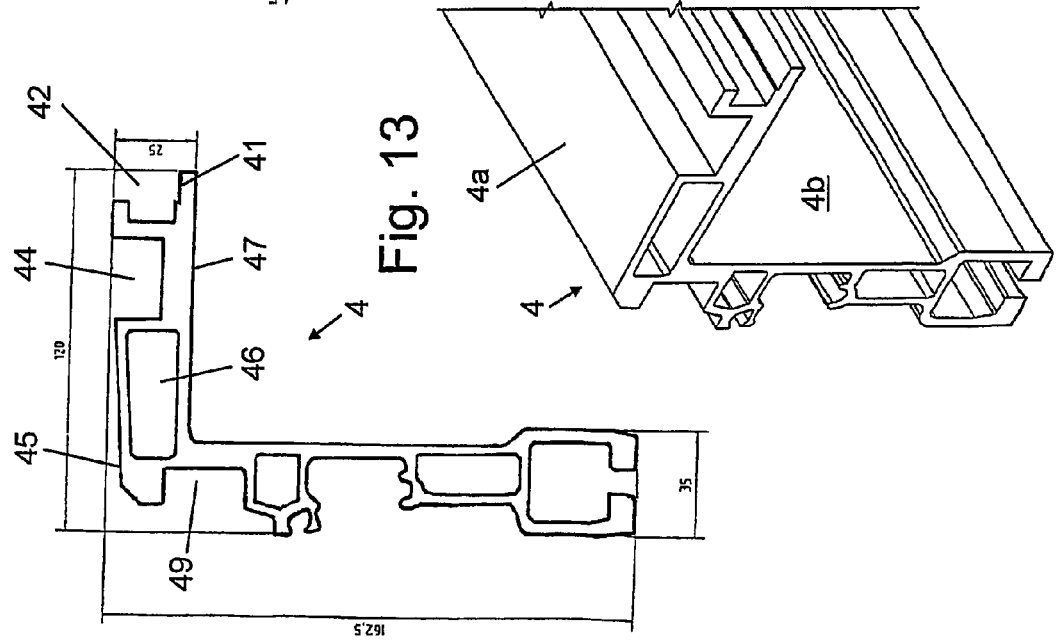
Fig. 14
Fig. 13
Fig. 12

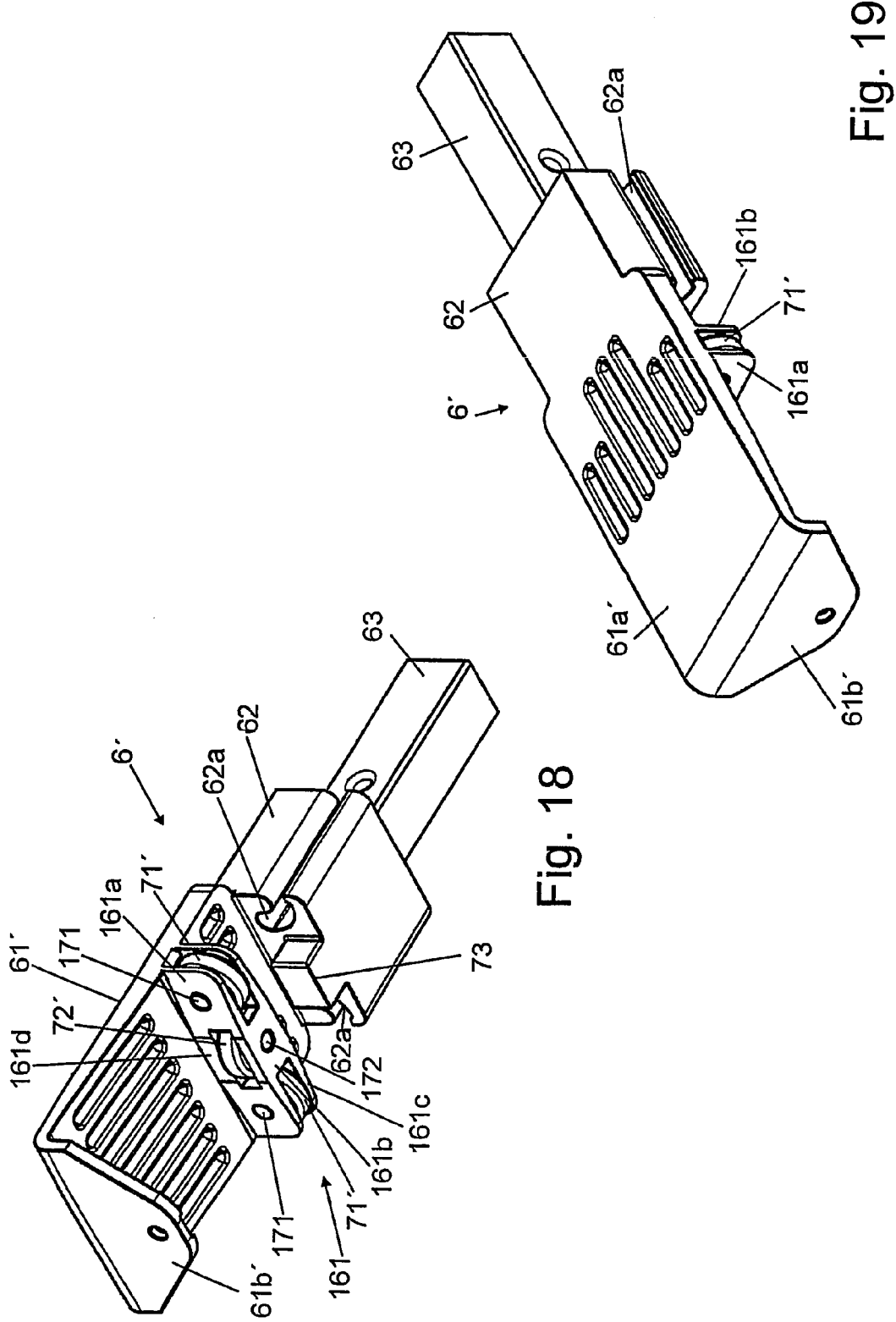

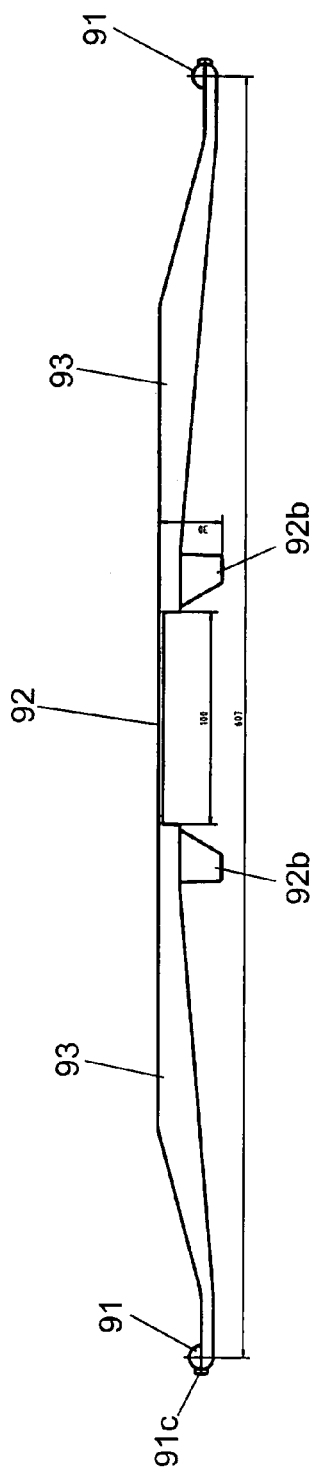
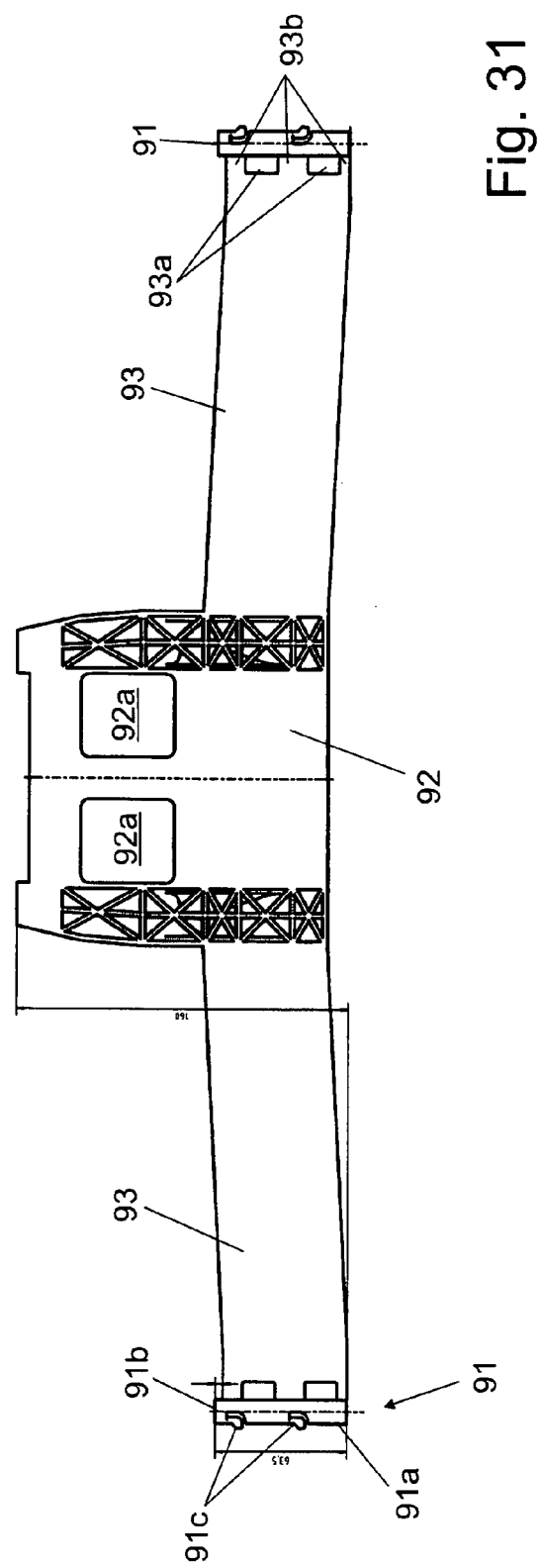

COVERING FRAME FOR A TARPAULIN STRUCTURE

The invention relates to a covering frame for a tarpaulin superstructure according to the preamble, of claim 1.

WO 00 12 334 A2 describes a tarpaulin superstructure in which a plurality of bows are moveable along two upper longitudinal members which are supported with respect to the vehicle chassis by means of stanchions, with respectively adjacent bows being connected to one another by means of flexible rest elements for positive folding of a tarpaulin. The bows have, at their end sides, sliding carriages which are embodied as roller carriages and are moveable along the longitudinal members. The rest elements are fastened in a form-fitting manner to the sliding carriages and lift the tarpaulin when the bows are pushed together. The roller carriage is composed of two sheet metal parts which are in engagement with one another, with the rollers being mounted by means of journals on the first sheet metal part, and the second sheet metal part extending into a hollow section of a bow shaft, with in each case two rest elements being held with their ends in each case in a sandwich-like manner between the two sheet metal parts. A disadvantage of the known covering frame is the high assembly expenditure since the two sheet metal parts can be plugged together only after the insertion of the rest elements, and the burdensome production of the sliding carriage.

It is the object of the invention to specify a covering frame as per the preamble of claim 1 which permits reliable and cost-effective production and assembly.

For the covering frame mentioned in the introduction, this object is achieved according to the invention with the characterizing features of claim 1.

The covering frame according to the invention permits assured and reliable folding of a roof tarpaulin, with the folding means in the region of the sliding carriage not being folded along a predetermined bending line but rather performing a for example circular-arc-shaped or rotating movement within the guide, which movement leads to the folding means being set upright.

The covering frame according to the invention can be easily assembled, with it being possible for the folding means to be inserted in a form-fitting manner in the guide of the sliding carriage, and therefore no further parts being required for fixing or assembly. For insertion, an end of the folding means or folding element is inserted into the guide in the direction of the axial extent of the guide, which is substantially parallel to the axis of the bow. It is possible to arrange the axis of the guide at a slight angle to the axis of the bow in order to obtain an advantageous influence on the folding behavior of the tarpaulin. Here, the sliding carriage can be easily connected to the folding means or other parts which can likewise expediently be inserted in the guide, thereby ensuring a simple and free movement. It is in particular ensured by means of the axial insertion that the corresponding form fit does not take place in the direction of the loading of the folding means, as a result of which the corresponding dimensions permit sufficient play for a pivoting or rotary movement. At the same time, a loading of the guide in the insertion direction is advantageously avoided in the operating state.

A thrust bearing is preferably provided in a wall, which faces away from the entry opening of the guide, of the sliding carriage, which thrust bearing holds a journal-like or bead-like projection and provides a blocking action at least upward, whereby the thrust bearing contributes to the introduction of forces, which act via the folding means, into the sliding carriage. A good bearing function can be obtained in this way in the case in particular of a rotatable pivoting action.

In each case one rest face is preferably provided on the sliding carriage for a folding means, which rest face serves as a stop for a correspondingly-shaped portion of the folding means, with the stop in each case limiting the rotation of the folding means in the guide, in particular preferably preventing that the folding means which is stretched out between two adjacent bows and is weighed down by the tarpaulin folds downward instead of being set upright as the frame is pushed together. In addition, a further stop is expediently provided, which further stop prevents an excessive pivoting-out movement and therefore an overturning of the folding means, with said stop preferably still permitting setting upright beyond 90°.

The folding means expediently have at least one cutout which makes it possible to pivot past those components of the sliding carriage which define the guide. In particular if the guide has one or more claws or claw-like receptacles which hold a portion, which is embodied as a journal, of the folding means, the regions which are required for the claws are provided as cutouts in the folding means, while the folding means is connected to the journal by means of webs. This creates a stable and resilient linkage at the end side on the folding means. A claw-like receptacle is advantageously characterized in that it has an aperture which permits a leadthrough of a part, here in particular the webs, which is narrower than the journal, of the folding means, without it being possible for the journal, which is formed in the manner of a bead and in one piece with the remainder of the folding means, to be pulled out through the aperture as a result of tensile loading. That portion of the folding means which is embodied as a journal then permits a pivoting movement about the axis of the journal. Here, the thickness of the folding means and the gap of the aperture of the claw are coordinated with one another. Likewise, the outer diameter of the journal and the cylindrical receptacle in the at least one claw are coordinated with one another. In order to obtain good guidance of the folding means, the guide advantageously comprises two claws which are aligned with one another, with the folding means having a web between the two claws.

At least one bent-out portion in the manner of a disengagement lug is preferably provided on the journal, which bent-out portion is compressed as the journal is inserted and then springs back into a position projecting over the periphery of the journal. Here, the disengagement lug comes into contact against the lateral delimitation of a claw and thereby prevents, in a form-fitting manner, the folding means from sliding out. This results in approximately play-free bearing of the journal, in which the disengagement lug is practically not loaded by normal actuation of the roof tarpaulin. It is also possible to provide the bent-out portion in a cavity of the claw-shaped receptacle, where it is less easily accessible.

Alternatively, the guide in the sliding carriage is of curved design, and a folding means has a curved end region which is expediently adapted to the shape of the guide of the sliding carriage and has a bead-like thickening which prevents a displacement out of the guide. The guide, which is open in an elongation of its curvature, is correspondingly advantageously provided there with a contraction whose dimensions permit a passage of the curved end region of the folding means, but not of the bead.

In order to insert the curved end region of the folding means, said end region is inserted axially, that is to say in the direction of the bow shaft, into the curved guide which is open to the inner side, where the dimensions of the guide are sufficient for the bead to also be inserted. The bow shaft is subsequently placed onto a corresponding section of the sliding carriage, as a result of which the opening for inserting the end region of the folding means is closed off and an inadvertent sliding out is prevented.

Said sliding carriage is expediently provided with two oppositely-situated curved guides, so that in each case one folding means can be adjoined at both sides. Here, the guides are expediently provided symmetrically, though it is also possible to provide the guides asymmetrically in order to provide different moments on the one and on the other side of the folding means.

The curved guide preferably has a circular-arc section which runs with a constant radius about a central axis, so that the end region which is inserted into the guide performs a rotational movement about said central axis. Here, the rotational movement is expediently set such that the folding means in each case assume a small angle relative to the horizontal when the cover is closed and the bows assume the maximum spacing to one another, while the folding means are aligned upward so as to form a triangle or a trapezium when the bows are pushed together. A further advantage which results from this is the fact that, as the open cover is closed, which takes place generally by means of the tensile force being introduced via the end-side portal beam and initially the first folding means being spread out, then the folding means between the first and the second bows, then the folding means between the second and the third bows etc., the transmitted forces do not especially load in particular the linkages of the first folding means and sliding carriage, but rather, as a result of the transmission of forces in the plane, a relatively uniform transmission of the forces takes place, in which case the risk of the end region of a folding means being ripped out of the guide is considerably reduced. The guide expediently comprises a plurality of circular-arc sections which are in part provided with different radii, wherein it is to be noted that the central axis need not expediently run parallel to the bow axis, but it can in fact be ensured by means of a small angle that, as the folding means is raised, the latter is simultaneously moved a small distance outward, as a result of which the tarpaulin additionally is advantageously tensioned.

Latching means are expediently provided in the guides, which latching means ensure the sliding but not the pivoting of the folding means. Considered for this purpose is for example a wedge face in the upper end of the guide, and also a bent-out portion which can be overcome and is preloaded in the locking position.

The sliding carriage is expediently produced from plastic, for example in an injection-molding process, whereby the guide can be formed using simple means, for example using removable cores. In this way, it is also possible for the latching means to be easily produced in one piece with the sliding carriage. In addition, stiffening ribs, by means of which material is saved, can be provided according to requirements.

Rollers are expediently provided on the sliding carriage, by means of which rollers the sliding carriage can roll on corresponding tracks of the longitudinal member, with the horizontally mounted rollers being provided as load-bearing rollers and the vertically mounted rollers being provided as guide rollers. Here, the weight of the bows is introduced substantially via the horizontal load-bearing rollers. It is possible to press the rollers, by means of central openings, onto plastic journals which are formed in one piece with the sliding carriage, such that complex riveting is dispensed with. Alternatively, it is also possible instead of rollers to provide rigid load-bearing elements which are formed in one piece with the sliding carriage and which then slide on the raceways. Two load-bearing rollers and at least one guide roller are expediently provided for each sliding carriage.

Particularly advantageous is the provision of a projection which, according to one preferred first configuration, projects beyond the outward-pointing end side of the load-bearing rollers or of the load-bearing elements, and is preferably formed in one piece with the sliding carriage. Here, the projection serves as an anti-tilt device which prevents the sliding carriage from being pried out of the guide of the longitudinal member. Here, the lower edge of the projection is designed such that it projects beyond the lower edge of the load-bearing elements or load-bearing rollers, such that permanent contact and the associated noise do not occur. If, however, one of the load-bearing rollers should break, then the projection simultaneously serves as an auxiliary load-bearing element which then sets down and prevents the sliding carriage being damaged overall, and maintains an emergency function of the bow. The projection expediently extends into a corresponding C-shaped profile section of the longitudinal member, the base of which C-shaped profile section is elevated slightly in relation to the running face for the load-bearing rollers, and the upper limb of which C-shaped profile section prevents the sliding carriage from being lifted out vertically, such that the load-bearing rollers roll on a first track of the longitudinal member and the projection penetrates into a C-shaped chamber which is adjacent to the first track. The projection preferably has a horizontal upper edge in order to avoid load peaks.

The projection is expediently arranged centrally between the two load-bearing rollers, such that also pivoting of the sliding carriage is possible only to a small degree.

A particularly advantageous, compact, structurally small and at the same time reliably-rolling arrangement of the sliding carriage is obtained in that the upper end side of the guide rollers is situated lower than the upper edge of the load-bearing rollers. This on the one hand considerably reduces the risk of tilting of the sliding carriage. In addition, the longitudinal member profile on which the sliding carriage is arranged can be of more compact and therefore more lightweight design. The guide rollers and the load-bearing rollers are expediently of the same dimensions, such that each roller can be used universally as a load-bearing or guide roller, so as to reduce the number of parts. The lower end side of the guide roller is also expediently arranged in a plane which is situated above the rotational axis of the guide rollers. This means that, as a result, the guide rollers are not to be provided in a plane arranged above the load-bearing rollers, so that the installation height of the sliding carriage can be more compact overall.

According to another preferred embodiment, the sliding carriage has a bearing portion which projects into an upwardly-open chamber of the longitudinal member, with both at least one load-bearing roller and also at least one guide roller being arranged on the bearing portion. This on the one hand creates a very compact embodiment of the sliding carriage, since the latter arranges the two rollers substantially as a cross, such that the installation space required for two separate bearing arrangements is saved. In addition, it is possible to form the sensitive transition region of the sliding carriage between the longitudinal member and guides to be thicker and therefore more robust.

The rollers are preferably mounted in the bearing portion at both sides, thereby considerably lengthening the service life of the bearing; in addition, any shocks can be better absorbed. Here, the bearing portion expediently has corresponding openings in ribs at both sides for the insertion of bearing journals for the rollers. As a result of at least the load-bearing rollers being mounted at both sides, a particularly stable and durable sliding carriage is created. Here, the two ribs are advantageously stabilized by means of a connection in their center, with it also advantageously being possible for the guide rollers to be mounted in said connection.

The folding means advantageously have a central lifting member which is connected to outer folding means portions by means of predetermined bending lines, so that as the folding means is raised by pivoting the curved end regions provided at the outer folding means portions or about the axis of the journal, the lifting member remains substantially horizontal and in contact against the roof tarpaulin, and thus, as the bows are pushed together, forms a contact face for lifting the roof tarpaulin. The lifting member is expediently formed in one piece with the folding means but can also be formed by an element which is plugged onto said folding means. Here, the central lifting member can expediently be disposed above the longitudinal members, such that when the roof tarpaulin is closed and the bows are therefore furthest remote from one another, the folding means nevertheless has a slightly trapezoidal design which, as the folding movement is initiated, permits a moment and therefore a simple folding movement. At the same time, the central lifting member forms a stop against the longitudinal members, such that even in the event of a jerky movement, excessively intense pulling at the folding means in the region of the curved guide or at the roof tarpaulin is prevented.

The guide is expediently arranged at a height below the upper edge of the longitudinal member, in order to permit the inclined initial position of the folding means.

Particularly good mobility is obtained if the curved end region of the folding means within the curved guide leads to a virtual elongation of the folding means in the set-upright state, such that particularly reliable folding of the tarpaulin takes place.

The covering frame is expediently used for a tarpaulin superstructure as is expediently provided in utility vehicles or containers, with it being possible for the longitudinal members to be composed of a plurality of portions which are arranged one behind the other and are supported via stanchions against a loading platform of the superstructure.

A sliding carriage, in particular for use in a covering frame as described above, which sliding carriage can be placed at the end side onto a bow shaft and on which sliding carriage are provided horizontal load-bearing elements, in particular horizontally mounted load-bearing rollers, and vertical guide elements, in particular vertically mounted guide rollers, is distinguished in that a projection is provided which, as an anti-tilt device, projects beyond the outward-pointing end side of the load-bearing elements. The projection can be arranged adjacent to is the load-bearing elements, preferably between adjacent load-bearing elements, but can also be formed as an elongation of the load-bearing elements. This advantageously provides that the load-bearing elements are not themselves moved under a profile limb, and need not be used as an anti-tilt device with the associated risk of damage.

A sliding carriage, in particular for use in a covering frame described above, which sliding carriage can be placed at the end side onto a bow shaft and on which sliding carriage are provided horizontal load-bearing rollers and vertical guide rollers, is distinguished in that the upper end side of the guide rollers is situated lower than the upper edge of the load-bearing rollers. As a result, it is advantageously not necessary to provide a separate plane for the guide rollers, such that the sliding carriage and longitudinal members can be of a compact design. The lower end side of the guide rollers is expediently provided in a plane above the rotational axis of the load-bearing rollers, as a result of which a small installation height of the longitudinal member can be obtained and at the same time the local thickening in the region of the sliding carriage for mounting the rollers is kept small.

A sliding carriage, in particular for use in a covering frame described above, which sliding carriage can be placed at the end side onto a bow shaft and on which sliding carriage are provided horizontal load-bearing rollers and vertical guide rollers, is distinguished in that the folding means can be inserted into a guide of the sliding carriage along the axis of the guide. Here, the axis of the guide is situated substantially in an at least largely horizontal plane and approximately perpendicular to the longitudinal direction of a longitudinal member along which the sliding carriage should be moveable. It is possible to provide a curved guide in which the curvature then runs not in the axis of the guide but rather in the plane normal to the axis of the guide, in which plane folding means can, in order to be set upright, perform a pivoting movement along the curved guide. The guide is expediently provided in a region within the opposite longitudinal member and therefore below, but at least not above, the rollers. In the case of a guide for mounting a journal, the axis of the guide is expediently situated close to the axis of the load-bearing rollers, and is preferably parallel to said axis in order to avoid disturbing moments.

A longitudinal member profile according to the invention, in particular for use in a covering frame described above, in particular in order to preferably arrange a sliding carriage described above so as to be moveable in the longitudinal direction, comprises a first, substantially horizontally arranged limb, and a further limb which is arranged substantially vertically downward, and is distinguished in that the first limb has an inwardly-pointing sliding track for a load-bearing element of the sliding carriage, and in that a C-shaped profile section which is open toward the sliding track is provided adjacent to the sliding track. Here, the inner side is that side of the longitudinal member which is aligned in the direction of the loading surface. The longitudinal member profile according to the invention advantageously makes it possible to not overbuild the region of the load-bearing elements which are preferably embodied as load-bearing rollers, so that the sliding track is easily accessible for cleaning and, in addition, the load-bearing elements, in particular articulatedly mounted load-bearing rollers, do not abut against an upper limb of the longitudinal member profile. In addition, this provides a relatively small installation height of the sliding-carriage/longitudinal-member unit, thereby increasing the useful height of the super-structure. A tilt lock of the sliding carriage can engage into the C-shaped profile section, such that the rolling movement and the tilt prevention of the sliding carriage on the longitudinal member profile are advantageously decoupled.

The base of the C-shaped profile section is preferably formed so as to be elevated in relation to the sliding track, so that a small step of approximately one millimeter is formed between the sliding track and the base of the C-shaped profile section.

An upwardly-open chamber is advantageously formed on that side of the C-shaped profile section which faces away from the sliding track, in which chamber can be inserted a vertical guide element, preferably guide rollers. The central strut of the C-shaped profile section therefore simultaneously delimits the C-shaped profile section on the outwardly-pointing side and the upwardly-open chamber on the side which points inward (that is to say toward the centre of the superstructure), such that receptacles are created on the longitudinal member profile with little material and therefore weight expenditure for load-bearing and guide elements.

A particularly compact longitudinal member profile is created in that the base of the upwardly-open chamber is situated below a bisector of the C-shaped profile section. In this way, the guide and load-bearing elements can be arranged compactly and closely adjacent to one another, and it is not necessary to provide a chamber entirely above the C-shaped profile section. It is also advantageously provided that the lower edge of the upper, substantially horizontal limb of the C-shaped profile section is situated above an axis which bisects the upwardly-open chamber.

The upper delimitation of the first limb is expediently formed so as to slope downward between the upwardly-open chamber and the outer edge, so that further material and therefore weight is saved. It is additionally possible to design the sliding carriage to be slightly conical at this point, which simplifies its production in an injection-molding process. At least one closed hollow chamber is expediently formed below the downward-sloping region, in order to better permit the production in an extrusion molding process and to additionally save weight and therefore material.

A further C-shaped and outwardly-pointing, open groove is expediently provided on the outwardly-pointing side of the longitudinal member profile, into which groove can engage a fold of the sliding carriage.

The first limb of the longitudinal member profile is expediently adjoined by a further limb of the longitudinal member profile, which further limb preserves the further functionality of the longitudinal member profile. For example, the provision of a receptacle for a load-bearing member of a side tarpaulin or of a contact face for a stanchion, means for fastening a customs-adapted closure or the like is to be provided, with the first limb of said profiles expediently being designed such that the same sliding carriages are moveable on said first limbs.

Another preferred embodiment of a longitudinal member profile has substantially only one upwardly-open chamber into which a bearing portion of a sliding carriage can be inserted, on which sliding carriage are provided both load-bearing rollers and guide rollers. By means of the arrangement of load-bearing rollers and guide rollers in the manner of the limbs of a "+" sign, the required play is reduced. The stability and therefore the service life of the sliding carriage are increased by means of mounting the rollers at both sides.

Further advantageous features of the invention can be gathered from the following description and from the dependent claims.

The invention is explained in more detail below with reference to the appended drawings on the basis of a preferred exemplary embodiment.

FIG. 10 shows a side view of the folding element from FIG. 9, transversely with respect to the direction of travel, as viewed from the main axis of the covering frame.

FIG. 11 shows a plan view of the folding element from FIGS. 9 and 10.

FIG. 12 shows a perspective view of a preferred exemplary embodiment of a longitudinal member profile according to the invention.

FIG. 13 shows a cross section through the longitudinal member profile from FIG. 12.

FIG. 14 shows a cross section through a horizontal limb of the longitudinal member profile from FIGS. 12 and 13.

FIG. 18 shows a perspective view from below of the sliding carriage from FIGS. 15 to 17.

FIG. 19 shows the sliding carriage from FIG. 18 in a perspective view from above.

FIG. 30 shows a side view of the folding element from FIG. 26, transversely with respect to the direction of travel, as viewed from the main axis of the covering frame.

FIG. 31 shows a plan view of the folding element from FIG. 26.

Figure 1:
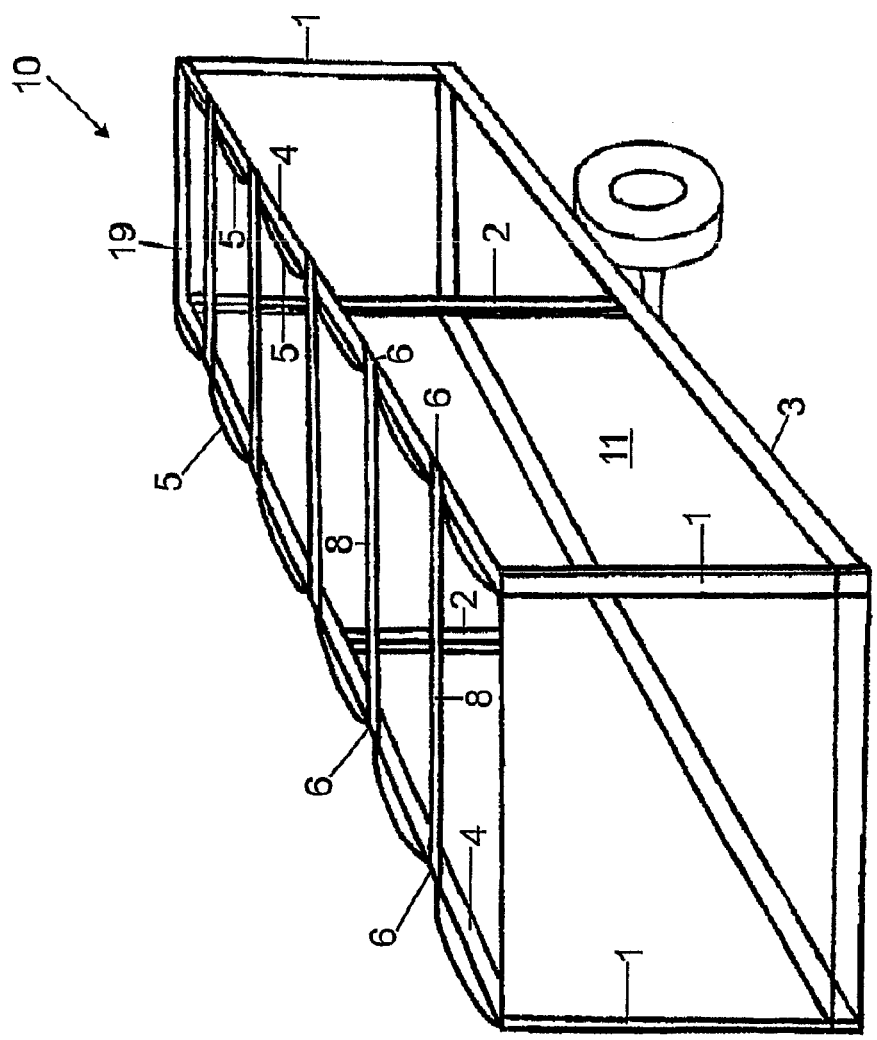
FIG. 1 shows a perspective view of a covering frame according to the invention for a tarpaulin superstructure.

The tarpaulin superstructure which is schematically illustrated in FIG. 1, which in the present case involves a semi-trailer, comprises a covering frame which is denoted overall by 10 and is built over a vehicle chassis 3, with a loading platform 11 supporting corner stanchions 1 and central stanchions 2 which support two lateral longitudinal members 4 which run in the vehicle direction. The longitudinal member 4 is composed of two parts which extend in each case to the center and are supported on a common central stanchion 2. For reasons of clarity, only two central stanchions 2 are illustrated; it has to be understood that a plurality of central stanchions 2 can be provided.

Bows 8 which run transversely with respect to the direction of travel extend between the parallel longitudinal members 4, which bows 8 have in each case one sliding carriage 6 at the end sides and which bows 8 overall support the roof tarpaulin which is denoted by 5. The bows 8 are moveable in the direction of travel by means of the bows 8 on corresponding raceways of the longitudinal members 4, with the tarpaulin 5 between adjacent bows being positively folded upward for this purpose. In order to lock the roof tarpaulin, a portal element 19 is provided in the rear region of the covering frame 10.

Figure 2:
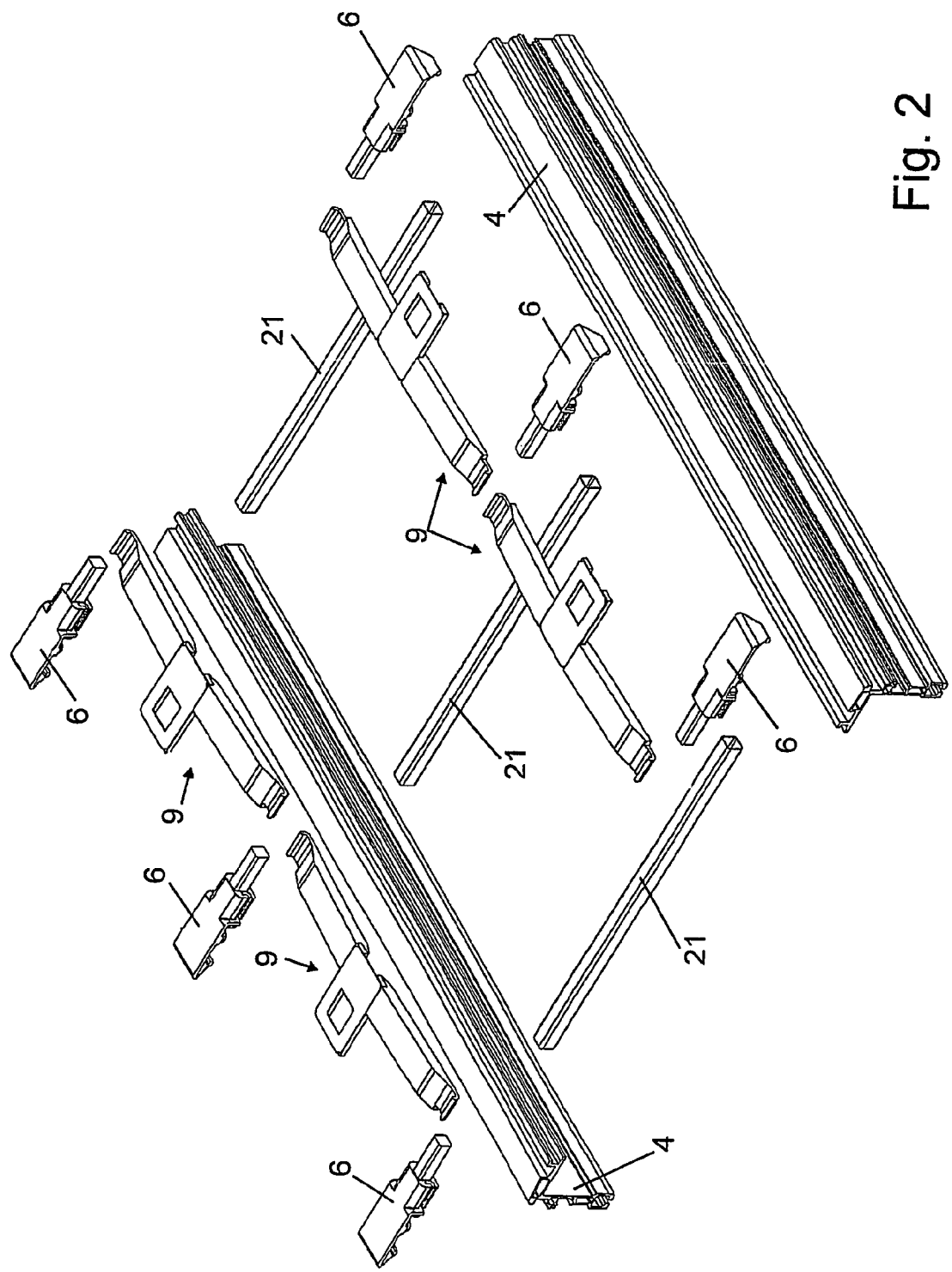
FIG. 2 is an exploded illustration of the upper parts of the covering frame from FIG. 1.
Figure 3:
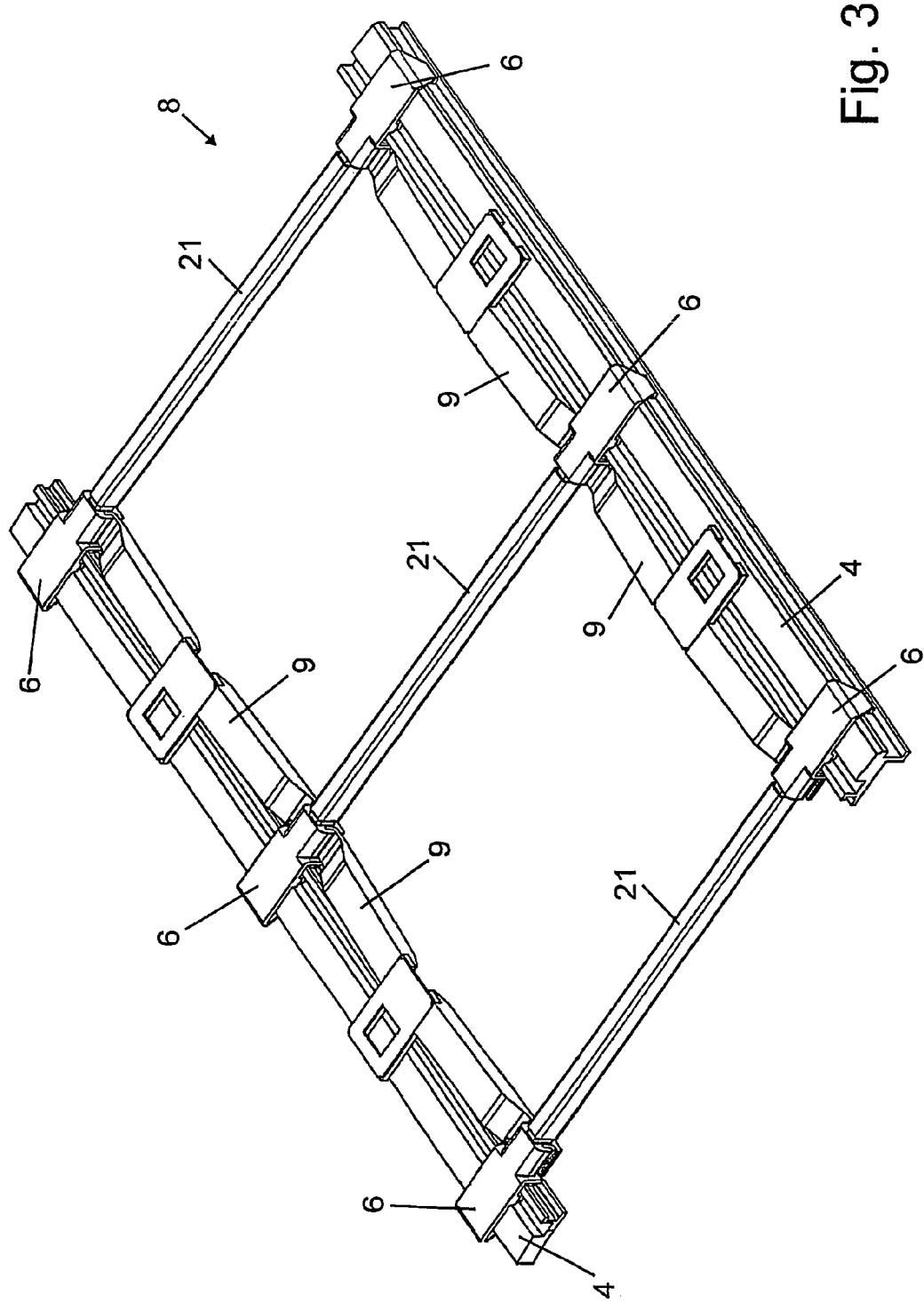
FIG. 3 is an assembled illustration of the upper parts of the covering frame from FIG. 1.

FIG. 2 illustrates an exploded illustration of the upper region of the covering frame 10, with the details of the bows 8 being illustrated in more detail. The bows 8 comprise a bow shaft 21 which is embodied as a square hollow profile and on which the sliding carriages 6, which are produced as plastic molded parts, can be plugged at the end side. Provided between in each case adjacent sliding carriages 6 which run on the same longitudinal member 4 are folding means 9 which, in FIG. 2, are illustrated in a substantially outstretched position which corresponds to the position when the roof tarpaulin is closed. In FIG. 3, the bows 8 are assembled, and the folding means 9 are inserted in curved guides, which are explained in more detail below, of the sliding carriage 6. It can be seen that, when the bow shaft 21 is completely pushed together, the curved guide in the sliding carriage 6 which is open toward the inside is closed off in such a way that the folding means 9 cannot escape. It can also be seen that a limb of the longitudinal member 4 is not illustrated, and that only that part of the longitudinal-member is illustrated which is required for the mobility of the sliding carriage 6.

Figure 4:
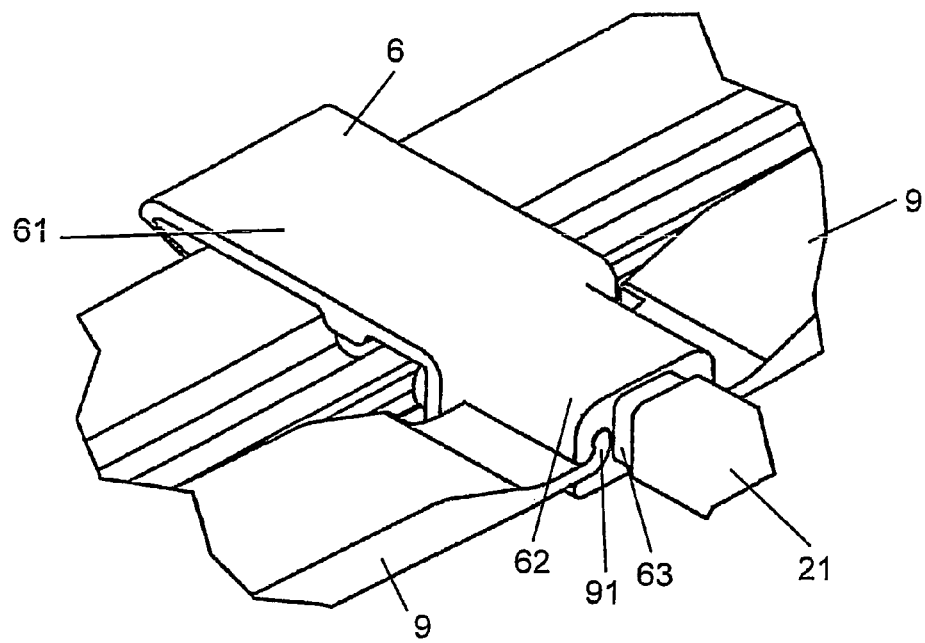
FIG. 4 shows, in a detail from FIG. 3, a perspective view of a sliding carriage.
Figure 5:
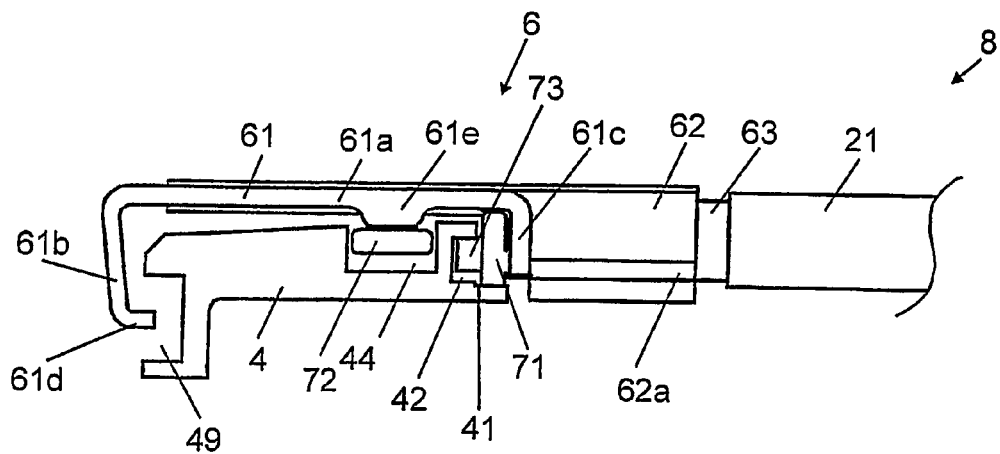
FIG. 5 shows, in a side view in the direction of travel, that part of a bow from FIGS. 1 to 3 with a sliding carriage which is arranged on a longitudinal member.

FIG. 4 shows, in greater detail, the manner in which the folding means 9 and the sliding carriage 6 interact. The sliding carriage 6 comprises a load-bearing region 61 which substantially surrounds the longitudinal member 4, a guide region 62 which adjoins the load-bearing region 61 toward the inside and on which the folding means 9 are arranged, and a plug-in region 63 which adjoins said guide region 62, can be inserted into the bow shaft 21, and has substantially a square design. The portions 61, 62 and 63 are produced in one piece from plastic in an injection-molding process. It can be seen that a curved guide 62a is formed in the guide region 62 on both sides in the material of the sliding carriage 6, which curved guide 62a is illustrated in more detail in FIG. 6. The curved guide 62a is formed by means of a continuous region within the guide portion 62 and so as to be open on the side pointing toward the vehicle center, in order to permit the insertion of a curved end portion 91 of the folding means 9. It can be seen that the delimitations of the curved guide 62a is composed substantially of circular-arc sections, which are illustrated with corresponding radii in FIG. 6. The pivoting of the folding means 9 therefore takes place about the central axis which is denoted by 62b. It can also be seen that, in the region close to the outlet of the curved guide, a ladle-like depression 62c which is formed with a spherical cross section is provided, in which the end position of the curved end region 91 is reached when the folding means 9 is set upright. The design of the load-bearing region 61 can be seen more closely in FIG. 5. The load-bearing region 61 is embodied as a substantially bracket-shaped portion, from whose base 61a, which is formed with a flat upper edge, protrudes an outer limb 61b and an inner limb 61c, with the end of the outer limb 61b having a fold 61d which runs substantially horizontally and engages into an outwardly-open, C-shaped chamber 49 of the longitudinal member 4. A pair of load-bearing rollers 71 is arranged on the limb 61c by means of a horizontal axle, which load-bearing rollers 71 are supported on a sliding track 41 of the longitudinal member 4. Two guide rollers 72 are mounted vertically on a rib-like, downward-pointing projection 61e of the base 61a, which guide rollers 72 extend into an upwardly-open chamber 44 of the longitudinal member 4 and are held with play between the vertical walls of said chamber 44. Formed in one piece with the sliding carriage 6 is a projection 73 which is arranged between the load-bearing rollers 71 and which projects into a C-shaped profile section 42, which is open toward the tarpaulin structure center, of the longitudinal member 4. The upper edge of the projection 73 runs a short distance below the upper limb of the C-shaped profile section 42, so that said projection 73 is in this way prevented from being lifted out. This makes it possible to arrange the upper edge of the load-bearing rollers 71 very close to the underside of the base 61a of the portion 61, so as to give a small installation height of the sliding carriage, since it is no longer necessary for a profile limb to be built over the load-bearing roller 71. It can also be seen that the lower edge of the projection 73 is situated closer to the lower limb of the C-shaped profile section 42 than the lower end side of the guide roller 72 is to the base of the upwardly-open chamber 44, so that in the event of failure of the load-bearing rollers 71, the projection 42 alternatively assumes the load-bearing function, and in this way, the guide rollers 72 are not damaged.

It can be seen that the guide rollers 72 are now arranged in the height section which extends over the height of the load-bearing roller 71, so that the upper end of the load-bearing roller 71 projects beyond the upper end side of the guide roller 72.

Figure 8:
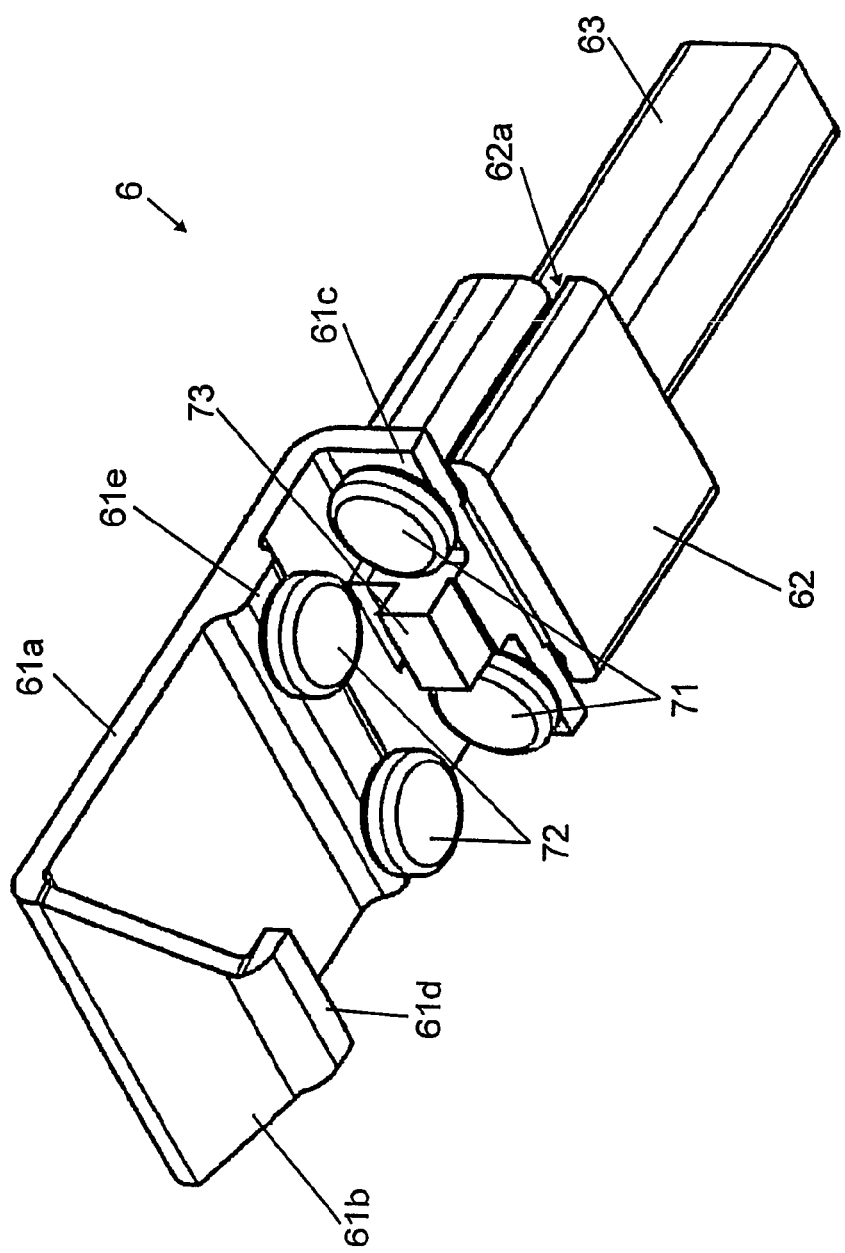
FIG. 8 shows a perspective view from below of the sliding carriage from FIGS. 4 and 5.
Figure 9:
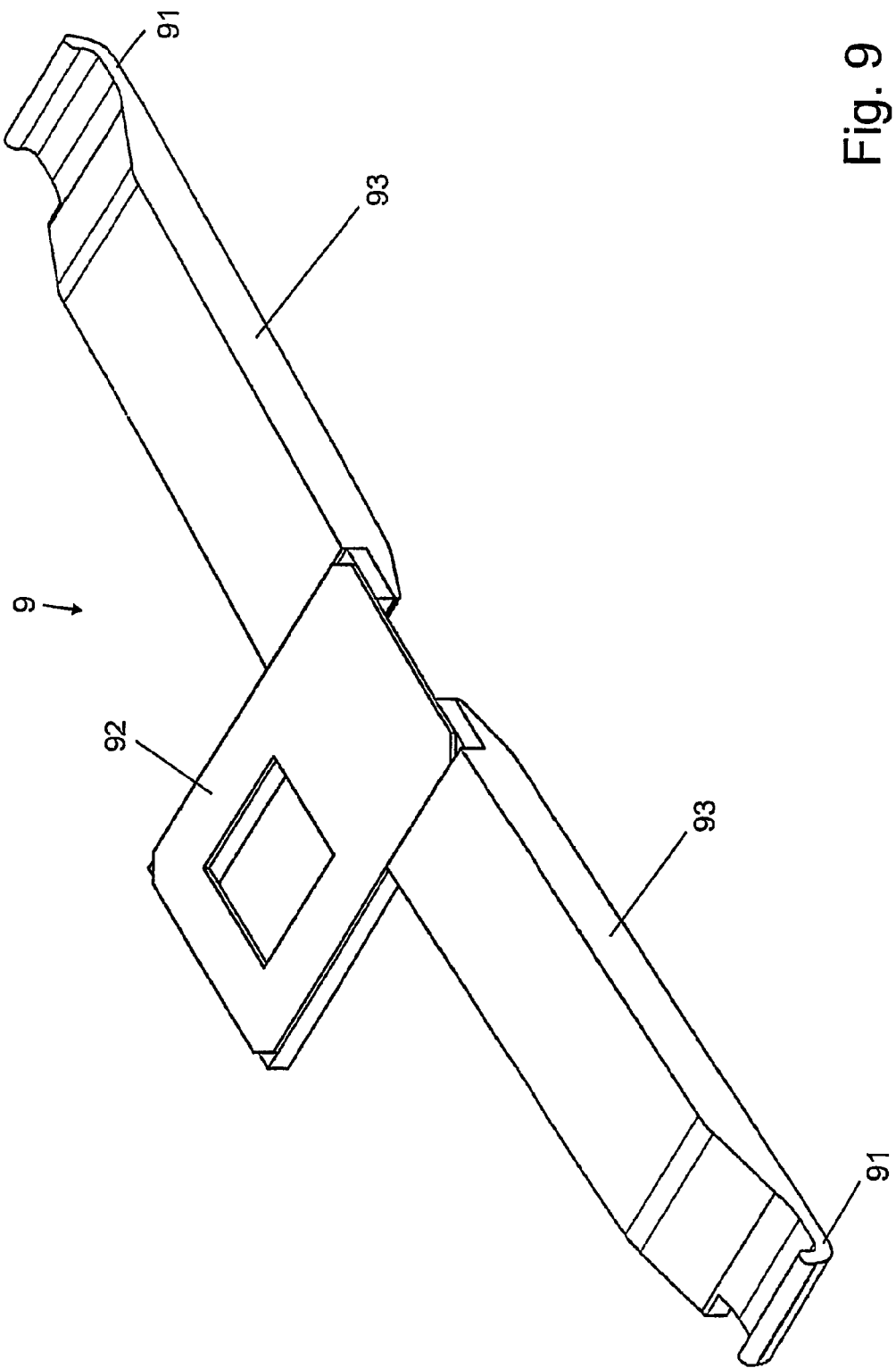
FIG. 9 shows a perspective view of a folding element from a covering frame as per FIGS. 1 to 3.
Figure 15:
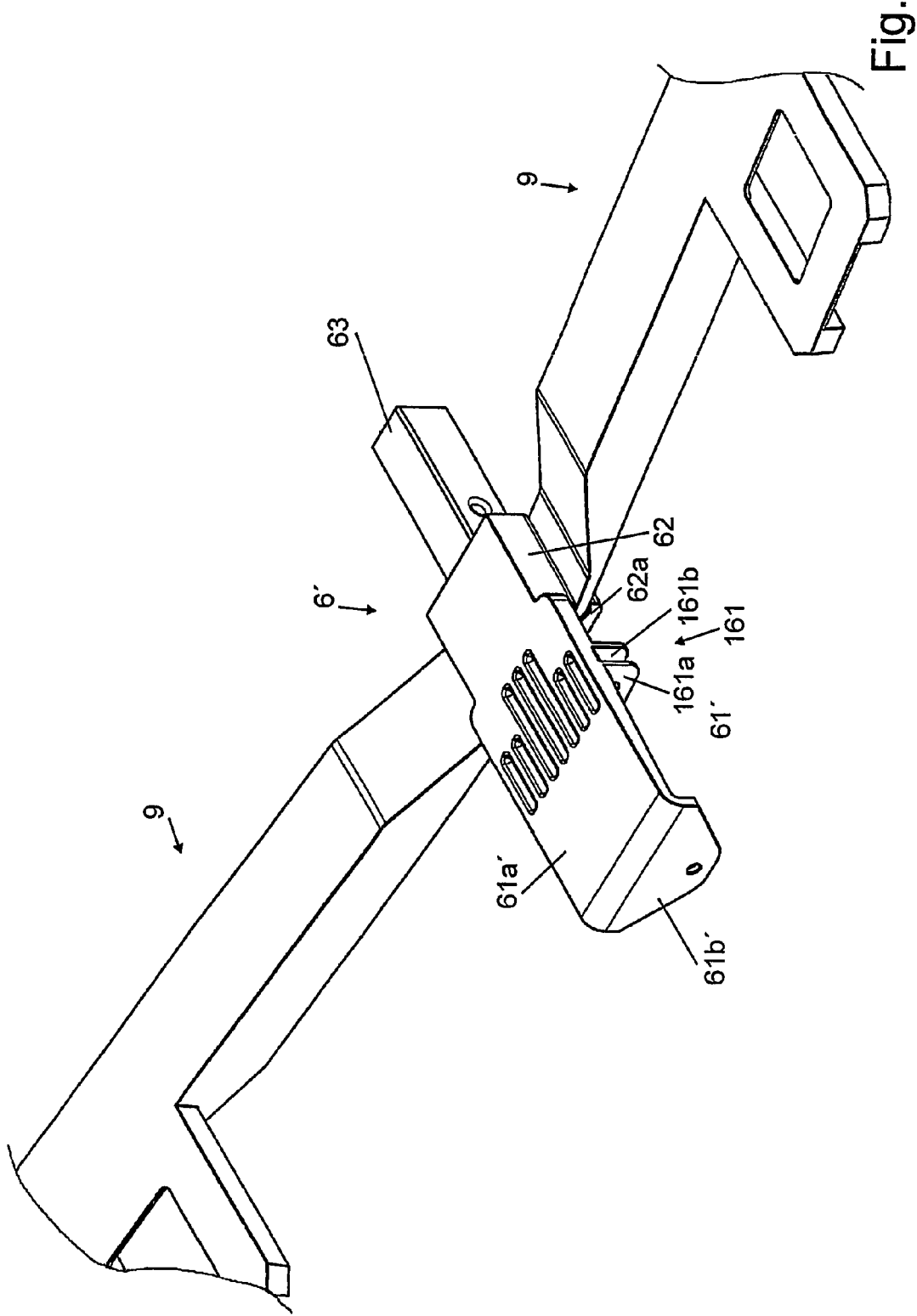
FIG. 15 shows a perspective view from above of an alternative assembled illustration of the upper parts of the covering frame from FIG. 1.
Figure 16:
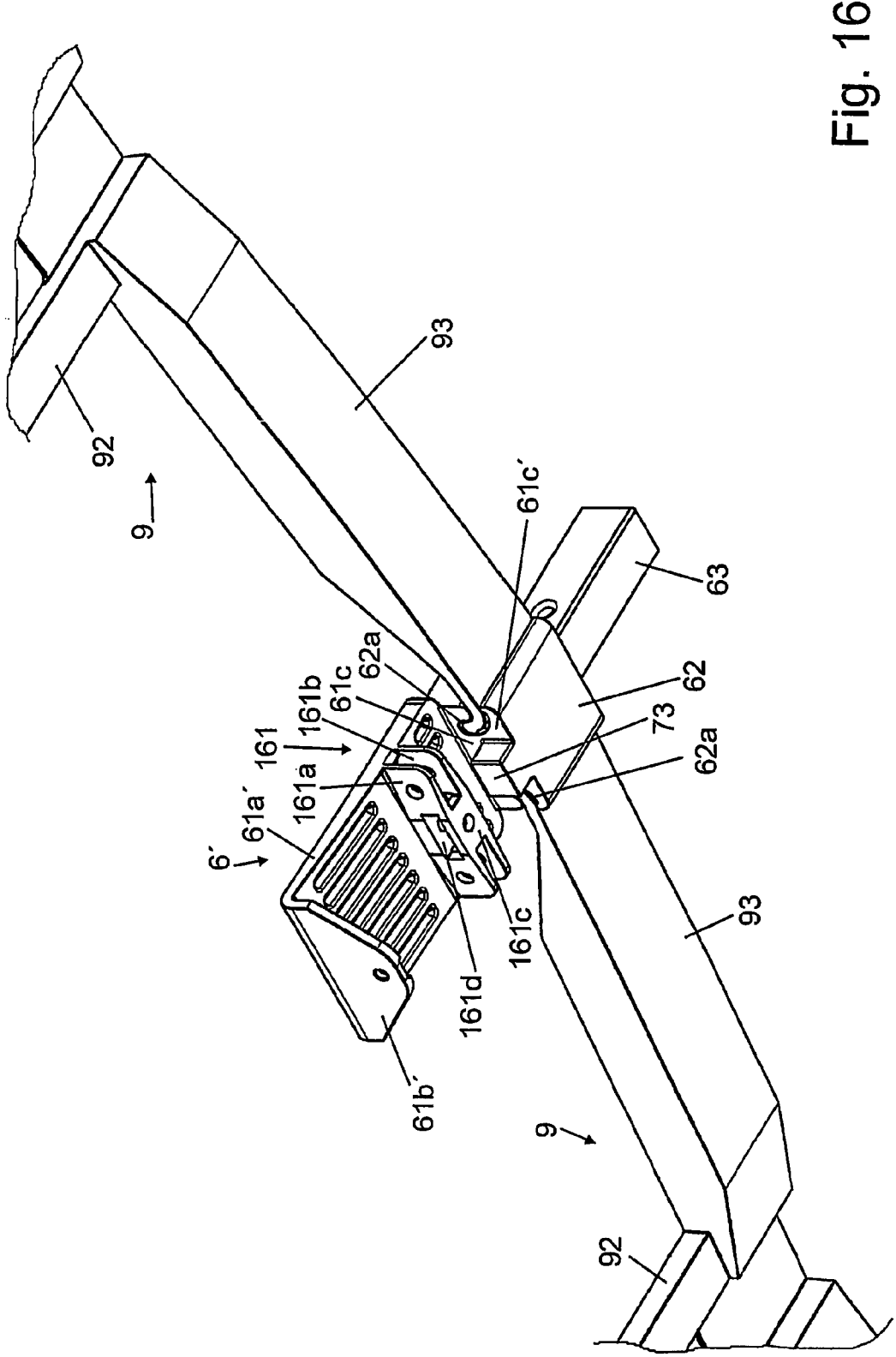
FIG. 16 shows a perspective view from below of the upper parts of the covering frame from FIG. 15.

FIG. 8 illustrates a view of the sliding carriage 6. It can be seen that the projection 73 is arranged centrally and slightly elevated between the two load-bearing rollers 71. It can also be seen that the projection 73 is produced in one piece from the plastic material from which the sliding carriage 6 overall is produced. It can also be seen that it is directly possible to provide rigid sliding elements instead of the rotatable rollers. It can finally be seen that the curved guide 62a forms, in addition to the insertion opening provided in the direction of the axis of the bow 8, a slot which runs parallel to the axis of the bow 8 and through which the folding means 9 moves in and out to a small degree.

With regard to FIGS. 9 to 11 and FIG. 7, the design of the folding means 9 is now explained in more detail. The folding means 9 has, at its two ends, a curved end region 91, at the end of which is formed a thickening 91a in the manner of a bead, cf. FIG. 7. The curvature of the end region 91 corresponds substantially to the curvature of the guide 62a, with an insertion through the slot which runs along the guide portion 62 not being possible on account of the thickening 91a, but with an axial insertion from the direction of the bow shaft 21 being necessary.

The folding means 9 has a central lifting member 92 which projects outward in relation to the outer folding means portions 93 which are attached to said central lifting member 92 and, as can be seen in particular in FIG. 3, comes to rest above the longitudinal member 4. Provided between the central lifting member 92 and the outer folding means portions 93 is a predetermined bending line which permits setting-upright of the folding means 9 in the manner of a trapezium, with the central lifting member 92 being in contact substantially with its upper side against the roof tarpaulin 5 and lifting the latter.

It can also be seen, in particular in FIG. 10, that the shape of a trapezium is indicated even when the folding means 9 is outstretched, as a result of which the folding of the outer folding means portions 93 upward is induced particularly easily, since a moment is already set. The folding means 9 is produced overall from plastic and is therefore flexible and of low weight.

Figure 6:
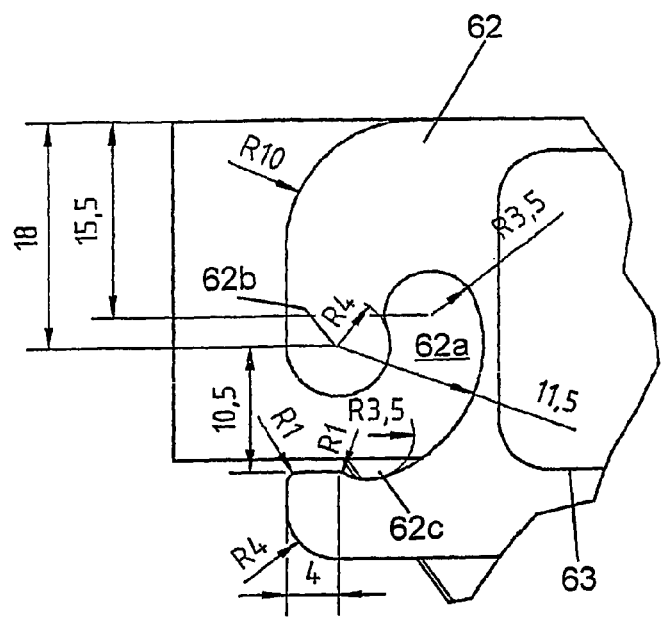
FIG. 6 shows an enlarged detail of the sliding carriage from FIGS. 4 and 5.
Figure 7:
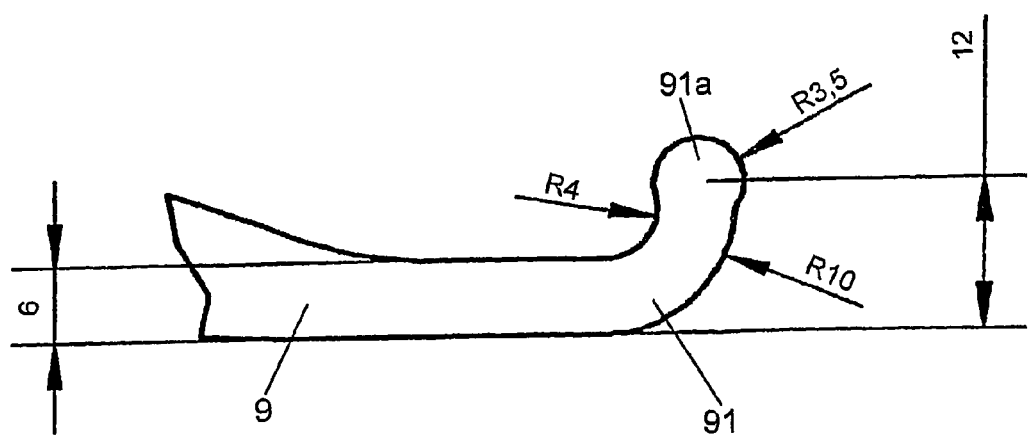
FIG. 7 shows an enlarged detail of the one folding element of a covering frame from FIGS. 1 to 3.

When considering FIGS. 6 and 7, it can be seen that, when setting the folding means 9 upright, the curved end 91 is moved from the upper end of the curved guide 62a of the sliding carriage 6 to the lower end of said curved guide 62a with the receptacle 62c. This simultaneously has the result that the effective part of the folding means 9 is extended to a small degree at both sides, and particularly effective folding of the tarpaulin is thereby ensured.

FIGS. 12 to 14 illustrate the details of the longitudinal member 4 more closely. It can be seen that the first limb 4a, specially adapted to the sliding carriage 6, of the longitudinal member 4 runs substantially horizontally, while the further limb 4b of the longitudinal member 4 leads away substantially vertically downward. It can be seen that the further limb 4b can be designed corresponding to the specific demands of the corresponding covering frame, without changing the details of the limb 4a. It is possible to see the compact design with the sliding face 41, the C-shaped profile section 42 which is open toward the vehicle center, the upwardly-open chamber 44, and the outwardly-pointing C-shaped recess 49. It is also possible to see a beveled region 45 between the upwardly-open chamber 44 and the outer edge of the longitudinal member 4, and a hollow chamber 46 which is provided below the beveled edge 45 and has a wall which runs substantially parallel to the edge 45. It can also be seen that the underside 47 of the first limb 4a is formed substantially horizontally, so that the stacked height of the load on the load platform is barely restricted. Particularly advantageous dimensions and corresponding proportions of the longitudinal member 4 can be gathered from FIGS. 12 to 14.

FIGS. 15 to 19 illustrate a second exemplary embodiment of a sliding carriage 6' with associated longitudinal member 4', in which the same reference symbols describe the same parts as in the first exemplary embodiment. It can be seen that the folding means 9 are of comparable design to the preceding exemplary embodiment of FIGS. 2 to 14. The guides 62a are illustrated as being open at both sides, though it is also possible to form the end side which points toward the longitudinal member 4' to be closed. In the guides 62a, the folding means 9 are prevented from sliding by means of a latching member which can be overcome during insertion, so that the functional position is easy to maintain even during assembly.

In contrast to the first exemplary embodiment, in the second exemplary embodiment, a bearing portion 161 projects downward from the base 61a', which bearing portion 161 is designed for mounting both two load-bearing rollers 71' and also one guide roller 72'. For this purpose, the bearing portion 161 has two ribs 161a, 161b which project substantially vertically from the base 61 a', the faces, which face toward one another, of which ribs 161a, 161b being formed substantially parallel in the region of the receptacle of the two load-bearing rollers 71', while the faces which face away from one another have in each case one bulged convexity. In a central region in which the single guide roller 72' is mounted centrally between the two load-bearing rollers 71', the two ribs 161a, 161b are connected to one another by means of a connection 161c which is arranged opposite a thickening 161d which is formed in one piece with the base 61a'. The faces, which face toward one another, of the parts 161c, 161d are arranged parallel to one another and substantially horizontally.

In each case one roller 71' and 72' which is mounted on a shaft 171 and 172 is inserted between the receptacles which are formed by the walls which face toward one another, with the shaft 171 being held in each case in openings of the two ribs 161a, 161b, while the shaft 172 is inserted into corresponding openings of the parts 161c, 161d. In this way, the rollers 71', 72' are arranged particularly compactly in the manner of a "+" sign in the same chamber of the longitudinal member 4'.

Figure 17:
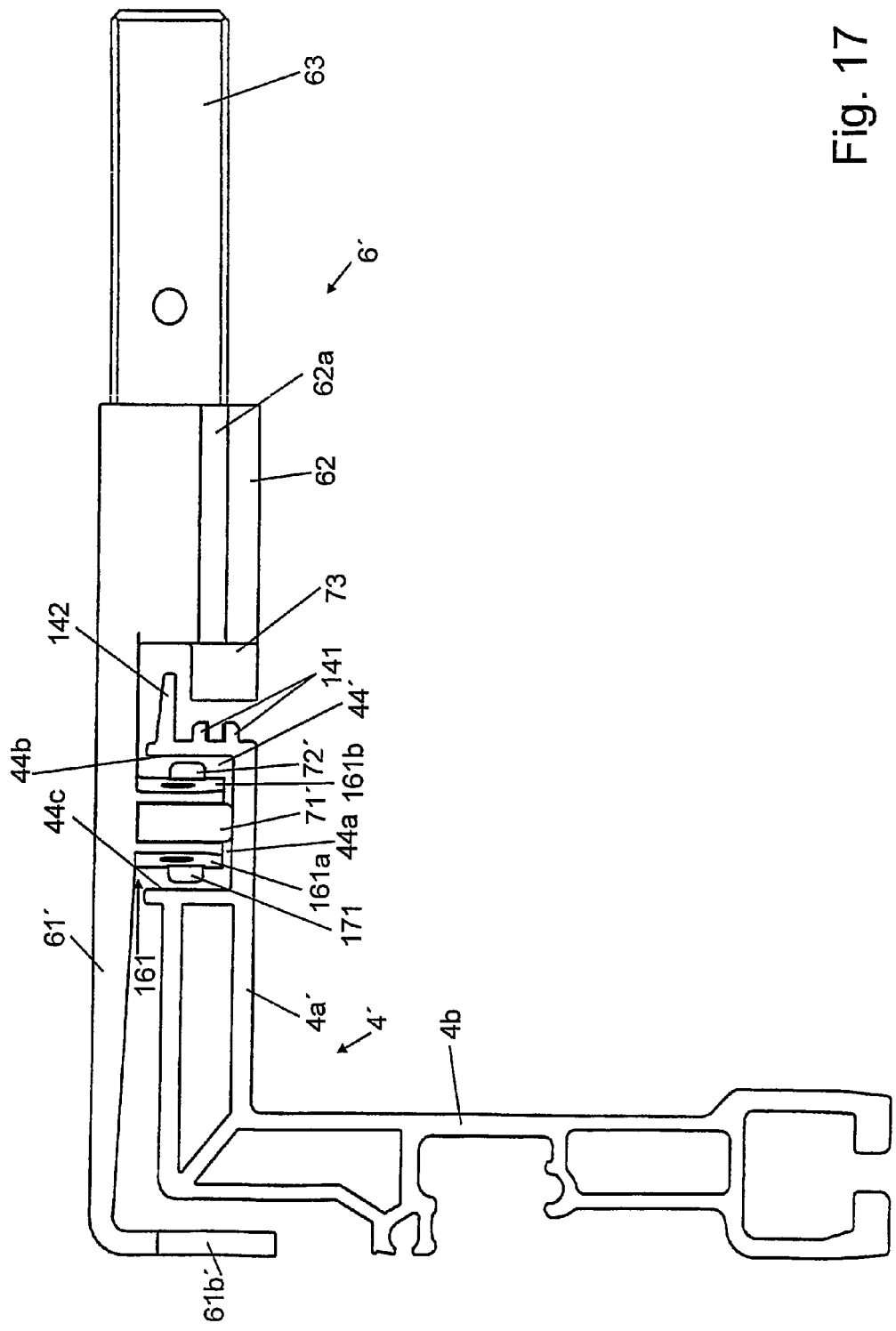
FIG. 17 shows, in a side view in the direction of travel, that part of a bow from FIGS. 1 and 15 with a sliding carriage which is arranged on a longitudinal member.

As can be clearly seen in particular in FIG. 18, the load-bearing rollers 71' project beyond the edges of the ribs 161a, 161b and are supported, as can be seen in FIG. 17, on the base 44a of an upwardly-open chamber 44', while the guide roller 72' is arranged approximately centrally at a small distance to the lateral walls 44b, 44c of the chamber 44', and thus permits slight play. From that side of the wall 44b situated to the inner side which faces away from the chamber 44' project two ribs 141 at the level of the projection 73, and further above said ribs 141, an inwardly-pointing horizontal limb 142, which engages over the projection 73 and thereby prevents said projection 73 from being lifted out.

It can also be seen that the outer limb 61b no longer has a fold, so that a corresponding, outwardly-pointing chamber is no longer necessary in the profile of the longitudinal member 4.

The invention now functions, with a curved guide, as follows:

Firstly, the folding means 9 are inserted with their curved ends 91 into the curved guide 62 of in each case two adjacent sliding carriages 6. The bow shaft 21 is subsequently guided via the plug-in region 63 of the sliding carriage 6, thereby creating a bow 8 with sliding carriages 6, and folding means 9 which connect the sliding carriages 6 to one another in pairs, at the end side. The bows are subsequently pushed onto the longitudinal members 4.

When the roof tarpaulin is closed, the folding means 9 are in their outstretched position corresponding to FIGS. 3 and 10, with the curved end 91 of the folding means 9 extending deep into the curved guide 62a of the sliding carriage 6. If the roof tarpaulin is to be opened, the bows 8 are pushed together along the longitudinal members 4, as a result of which the folding means 9 are set upright in order to compensate the reduced distance between adjacent bows 8. Here, the curved end 91 travels downward within the curved guide 62a about the central axis 62b, so that in the end position, the greatest part of the curved portion 91 projects out of the slot-like, narrowed opening of the curved guide 62a. Here, the central lifting region 92 of the folding means 9 is raised. A particular advantage of the arrangement is that the bows 8 can be pushed directly adjacent to one another, with the two outer folding portions 93 then assuming an almost vertical position, such that the roof tarpaulin can be pushed together to a maximum extent.

FIG. 20 to 34 illustrate a third exemplary embodiment 6" with associated longitudinal member 4", in which the same reference symbols describe the same parts as in the first exemplary embodiment. It can be seen that the longitudinal member 4" is very similar to the longitudinal member 4 of the first exemplary embodiment, and that in particular the sliding carriages 6 and 6" can be moved on the longitudinal members 4 and 4". In contrast, the connection of the folding means 9" to the guide region 62 is different.

Figure 32:
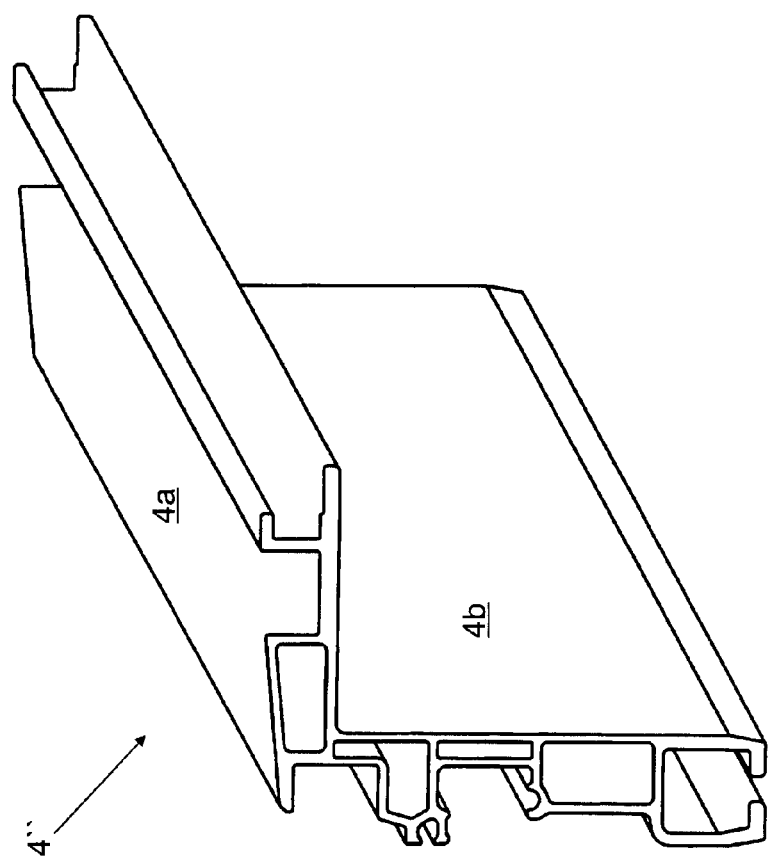
FIG. 32 shows a perspective view of another preferred exemplary embodiment of a longitudinal member profile according to the invention.
Figure 33:
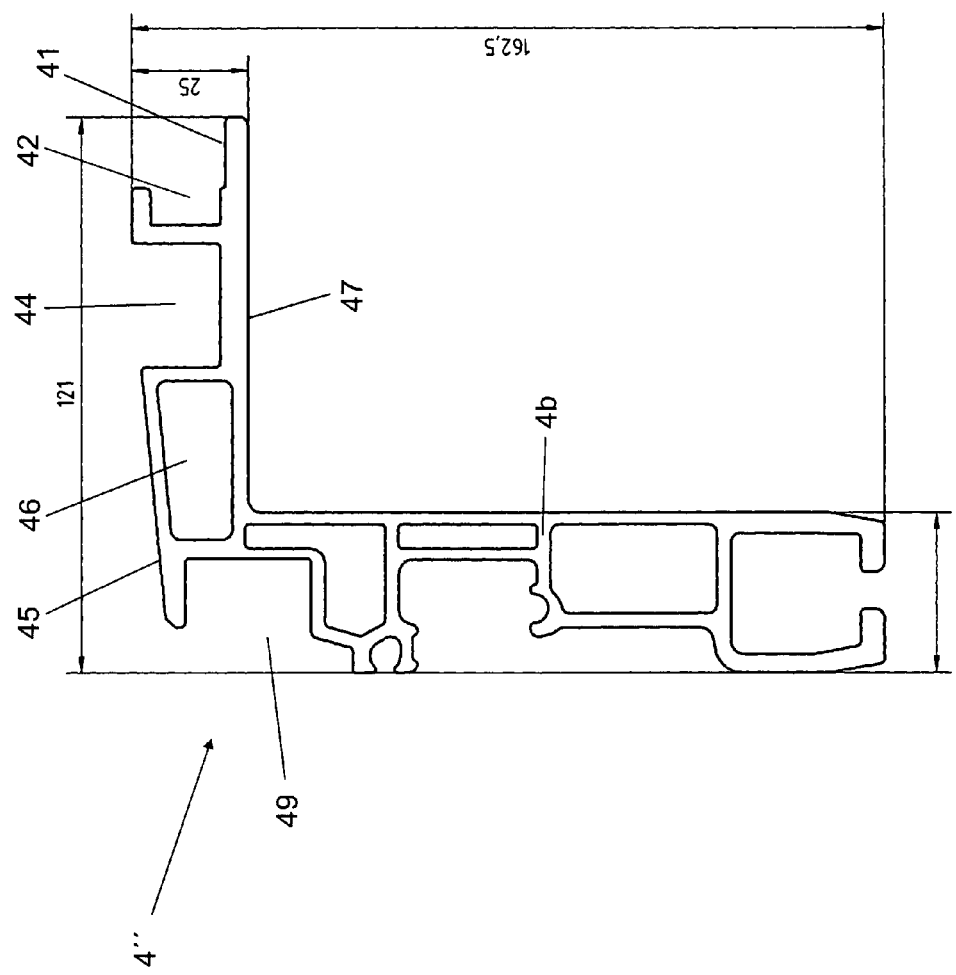
FIG. 33 shows a cross section through the longitudinal member profile from FIG. 32.
Figure 34:
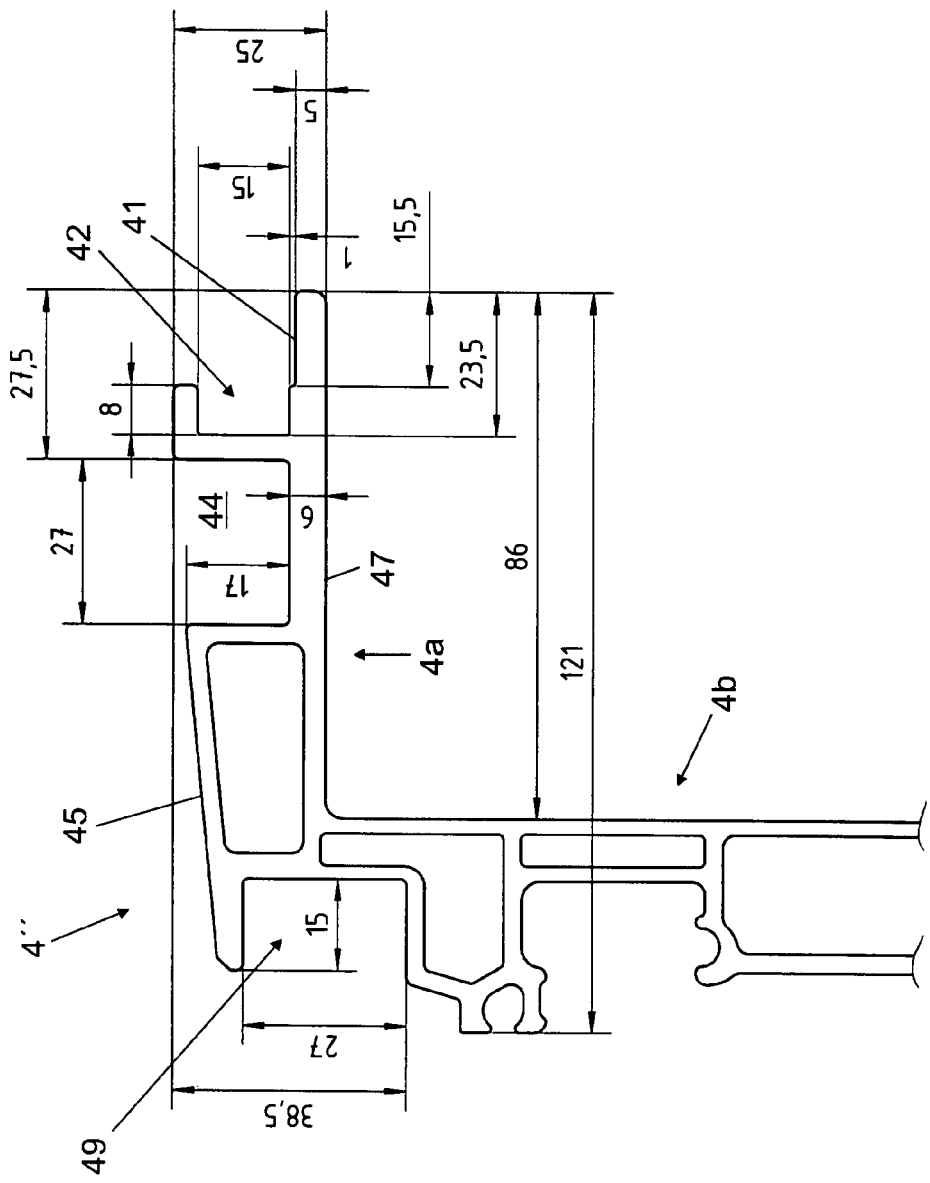
FIG. 34 shows a cross section through a horizontal limb of the longitudinal member profile from FIGS. 32 and 33.

FIG. 32 to 34 illustrate the details of the longitudinal member 4" more closely. The first limb 4a, which is adapted to the sliding carriage 6 or 6", of the longitudinal member 4" runs substantially horizontally, while the further limb 4b of the longitudinal member 4" leads away substantially vertically downward. In contrast to the first exemplary embodiment, the design of the further limb 4b is slightly modified, thereby permitting a rectilinear wall, which points toward the loading surface, of the longitudinal member 4", and in addition, material is saved by means of additional hollow spaces. In particular, the chamber 49 has been offset upward slightly in relation to the longitudinal member 4, as a result of which the height of the further limb 4b can be slightly shortened overall.

The longitudinal member 4" also has a small step of approximately 1 mm in height between the sliding surface 41 and the base of the C-shaped profile section 42, which base permits advantageous interaction with the load-bearing rollers 71 or with the projection 73. It can also be seen that the width of the sliding surface 41 has been increased in relation to the first exemplary embodiment and said width now makes up approximately double the depth of the C-shaped profile section 42, while in the first exemplary embodiment, the ratio is only slightly more than 1.5. In addition, the base of the C-shaped profile section 42 and the base of the upwardly-open chamber 44 are now situated on a plane.

Figure 20:
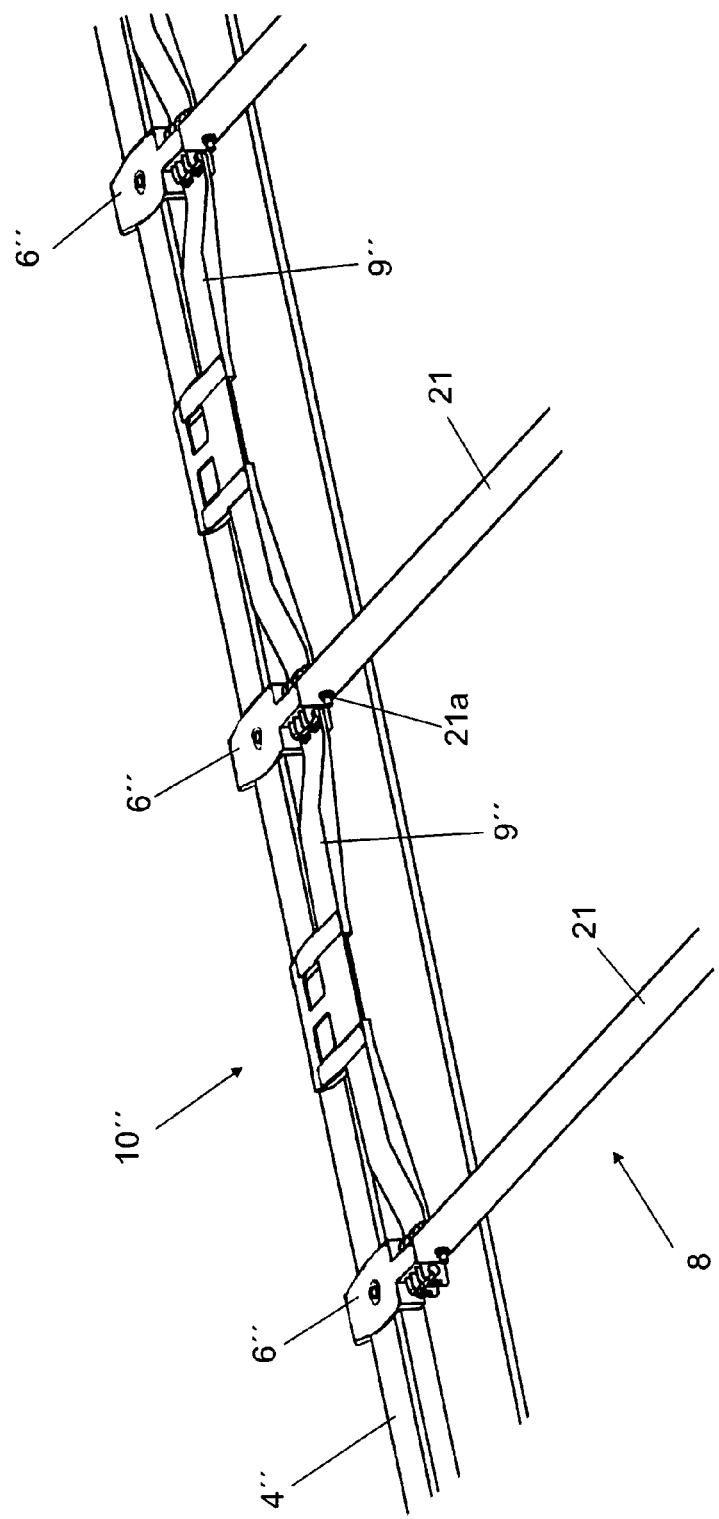
FIG. 20 shows a perspective view of a detail of a further embodiment of the upper parts of the covering frame from FIG. 1.
Figure 21:
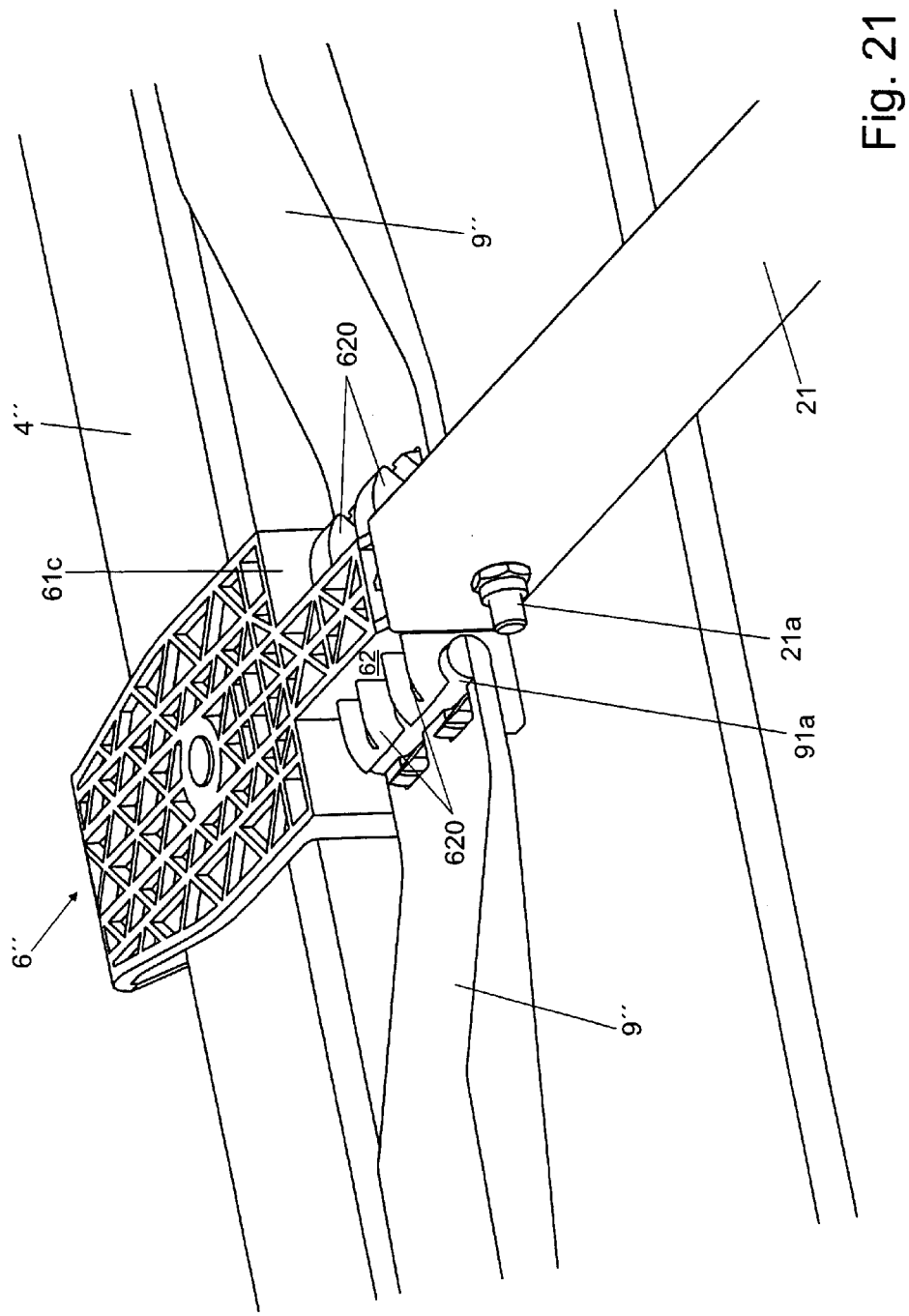
FIG. 21 shows, in a detail from FIG. 20, a perspective view of a sliding carriage.
Figure 22:
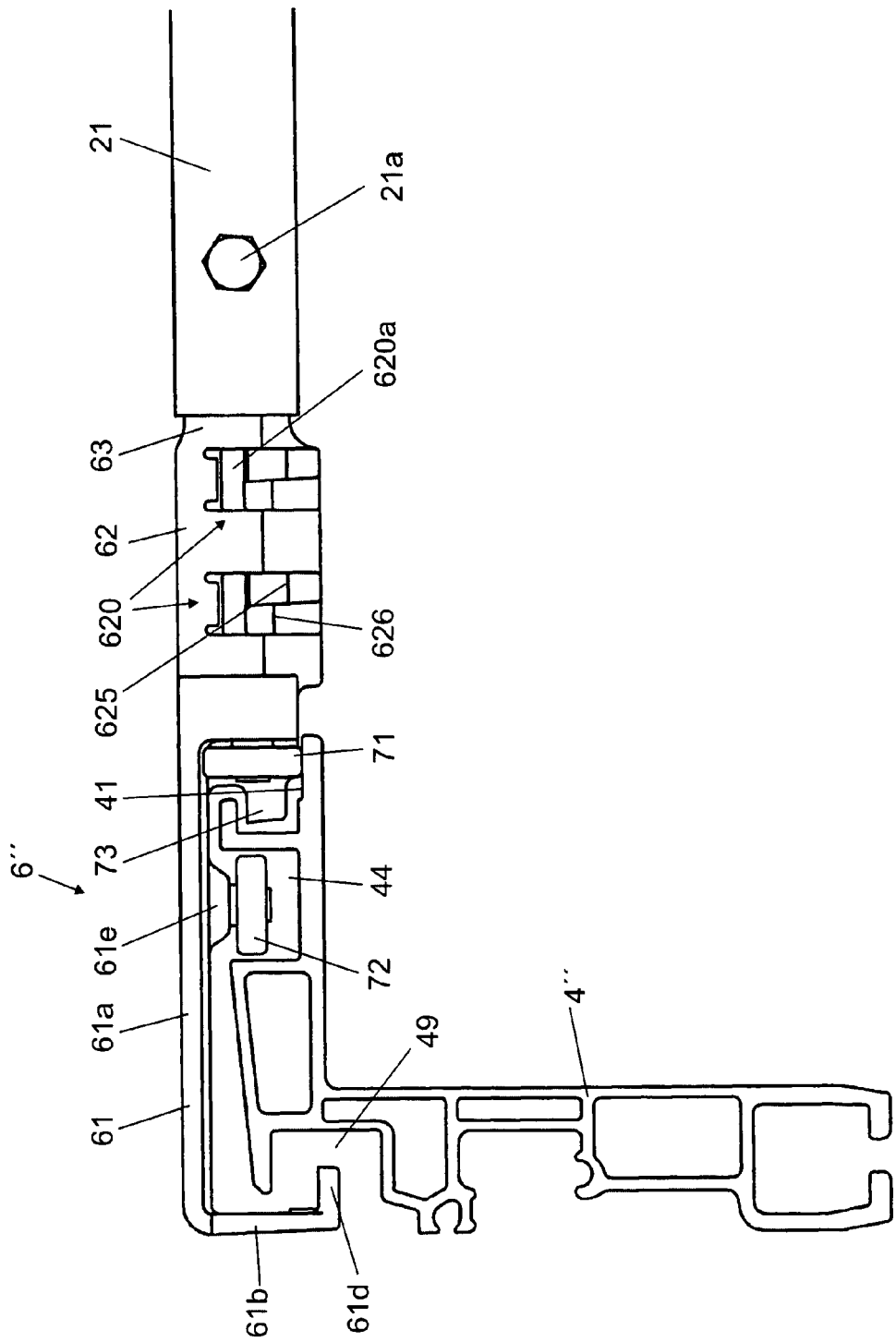
FIG. 22 shows, in a side view in the direction of travel, that part of a bow from FIGS. 20 and 21 with a sliding carriage which is arranged on a longitudinal member.

In FIGS. 20 and 21, it is possible to see that the covering frame 10" is again composed of longitudinal members 4" and bows 8, with adjacent bows 8 being connected to one another in pairs in the region of the longitudinal members 4" by folding means 9", with the bows 8 being formed by a bow shaft 21 which is embodied as a hollow part and is connected in each case at the end side to a sliding carriage 6" by a connecting means 21a. The plug-in region 63 of the sliding carriage 6" differs structurally only slightly from that of the first exemplary embodiment, and is in particular characterized in that recesses are already provided transversely with respect to the axis of the bow shaft 21, which recesses facilitate an insertion of connecting means 21a. The load-bearing region 61 differs slightly from the load-bearing region 61 of the first exemplary embodiment, in particular in that only one guide roller 72 is required, which is arranged on a projection 61e which no longer spans the width of the sliding carriage 6" but rather projects downward from the latter in a punctiform manner. In addition, the outer limb 61b is arranged substantially vertically, and the fold is composed substantially of two flat projections 61d which project in the direction of the chamber 49.

With reference to FIGS. 26 to 31, it is possible to see the design of the folding means 9" which is modified in relation to the first exemplary embodiment. As is the case in the first exemplary embodiment, the folding means 9" comprises a central lifting member 92 which projects outward in relation to the outer folding means portions 93 which are connected thereto, and comes to rest with the projecting region above the longitudinal member 4". In contrast to the first exemplary embodiment, however, no predetermined bending line is provided between the lifting member 92 and the folding means portions 93; that region of the lifting member 92 is in fact formed with reduced material thickness and additionally has two cutouts 92a which are arranged symmetrically in the face of the lifting member 92, so that, on account of the material thinning, a fold occurs in the region of the lifting member 92. It can also be seen in FIG. 30 that an alignment member 92b is provided on the underside of the lifting member 92 in each case in the region adjacent to the folding means portions 93, which alignment member 92b is substantially aligned with that side of the limb 61c which points toward the longitudinal member 4", and is therefore provided in the region adjacent to the longitudinal member 4", thereby providing a positioning aid when the roof tarpaulin 5 is closed, since the lifting member 92 then comes into contact not only with its underside against the surface of the longitudinal member 4", but also with the delimitations, which face toward the longitudinal member 4", of the parts 92b against the inwardly-pointing edge of said longitudinal member 4".

In contrast to the first exemplary embodiment, the end region 91 of the folding means 9" is not of curved design but rather tapers substantially horizontally to a journal region which is formed in one piece with the plastic folding means 9", which journal region has a journal 91a which is designed to be inserted into the guide 62a of the guide portion 62 of the sliding carriage 6", as will be explained in more detail further below.

Figure 27:
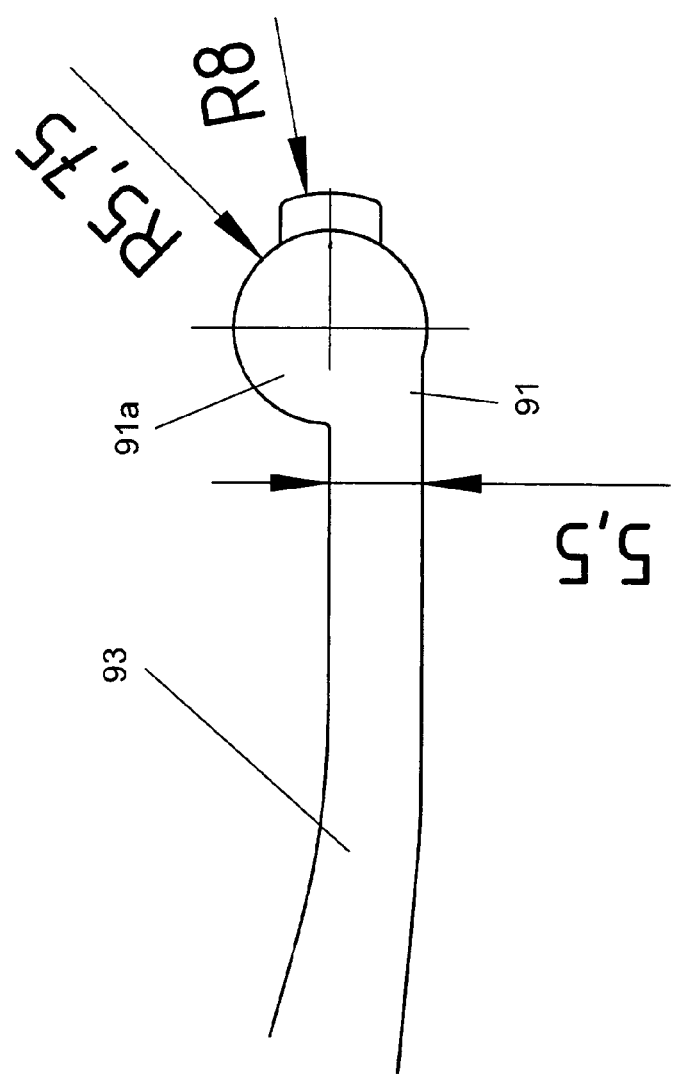
FIG. 27 shows an enlarged detail of the one folding element of a covering frame from FIGS. 20 and 21.
Figure 28:
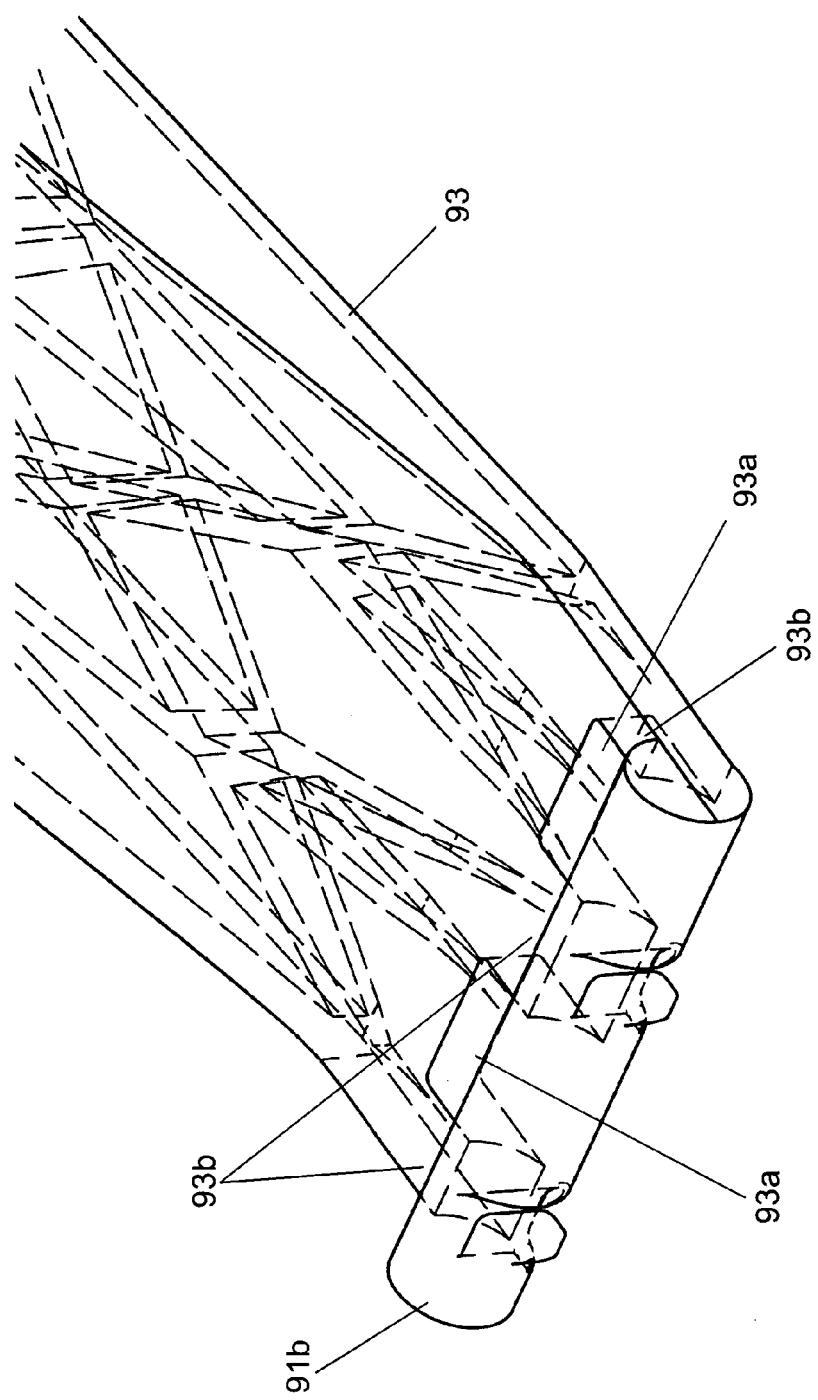
FIG. 28 shows a perspective view of an enlarged detail of the folding element as per FIG. 26.

The horizontal transition of the folding means portion 93 to the end portion 91 with the journal 91a can be clearly seen in particular in FIGS. 27 and 28. It can be seen that the outer folding means portions 93 are of largely smooth design on their upper side, while being provided on their underside with ribs in order to increase stiffness and to reduce the weight which otherwise results from the thickness of the material. It can also be seen that the journal 91a projects a small distance of approximately 4 mm in relation to the outer folding means portion 93, wherein said projection 91b can be held in a particular region of the guide 62a, as will be explained in more detail further below.

In addition, bent-out portions or disengagement lugs 91c are formed on the journal 91a, which bent-out portions or disengagement lugs 91c project beyond the periphery of the journal 91a and, as the journal 91a is inserted into the guide 62a, are pushed into the region of the journal, but effectively prevent the journal 91a from being pulled out again. The bent-out portions or disengagement lugs 91c are produced in one piece with the journal 91a and the folding means 9", with the journal 91a being correspondingly cut out in the region of the disengagement lugs 91c in order that the disengagement lugs 91c can be pushed into the cutout as the journal 91a is inserted.

Two cutouts 93a are provided in the region, which adjoins the journal 91a, of the outer folding means portion 93, such that webs 93b for the lateral delimitation of the cutouts 93a are formed, which webs 93b substantially connect the journal 91a to the remaining outer folding means portion 93. It is possible to variably select the width of the webs 93b. It is also possible to form the cutouts 93a, at their longitudinal edge which faces away from the journal 91a, with a step 93a' which can abut against a correspondingly formed stop on the sliding carriage 6", in order to prevent the folding means 9" from dropping below a horizontal position.

The guide 62a on the guide portion 62 of the sliding carriage 6" and its interaction with the end region 91 and the journal 91a of the folding means 9" is now explained in more detail with reference to FIGS. 21 to 25.

Figure 23:
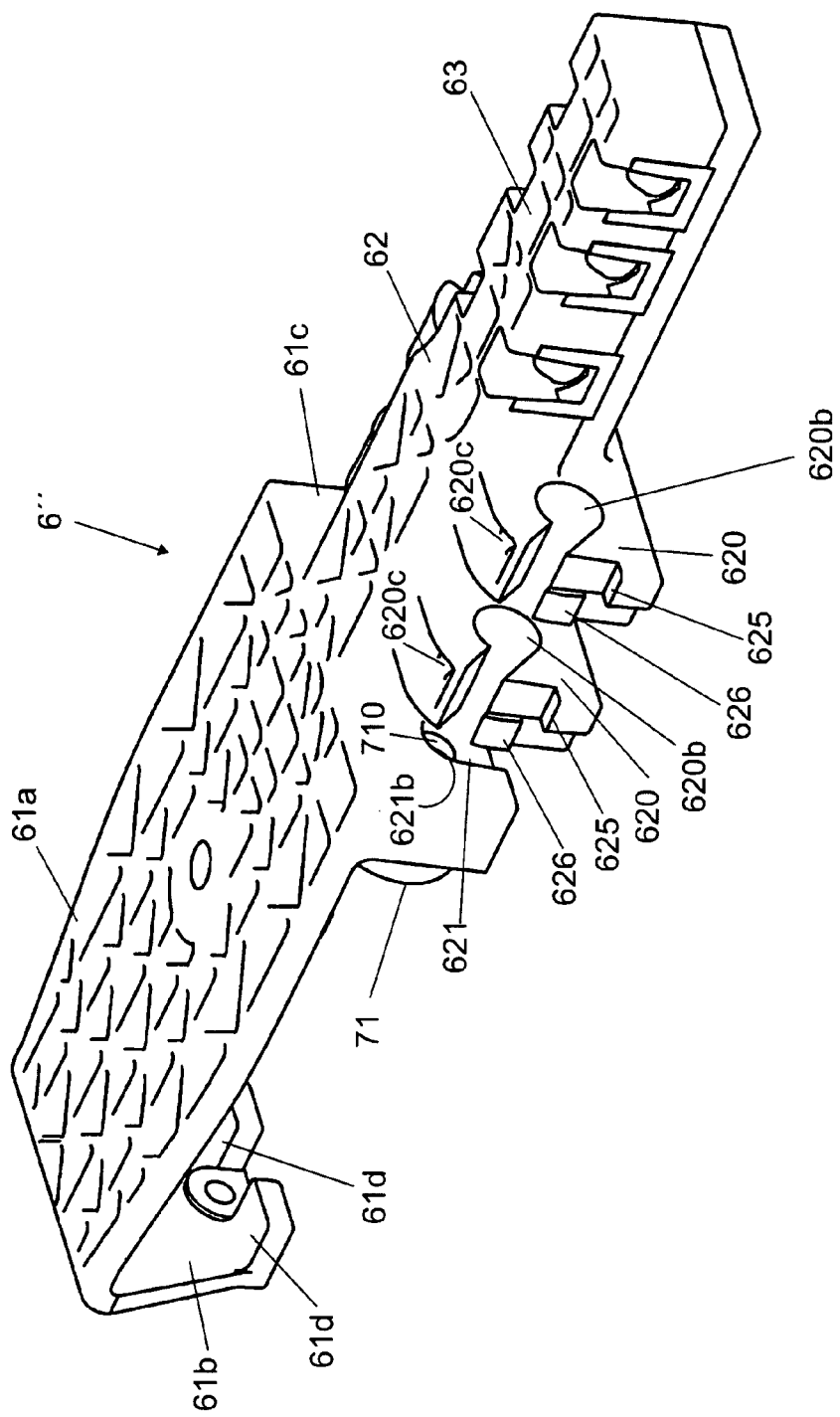
FIG. 23 shows a perspective view from above of the sliding carriage from FIGS. 20 to 22.
Figure 24:
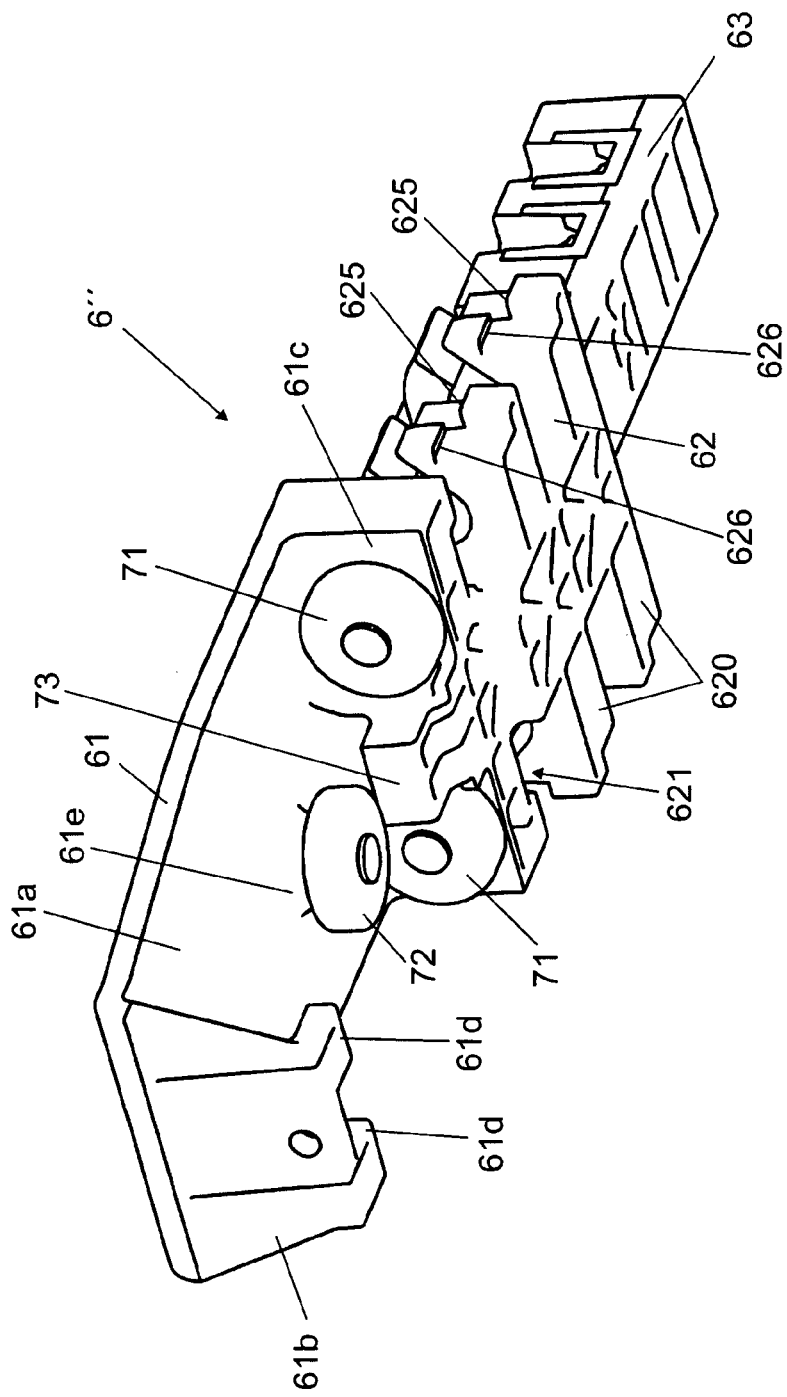
FIG. 24 shows a perspective view from below of the sliding carriage from FIGS. 20 to 22.

As can be clearly seen in particular in FIG. 23, in which the sliding carriage 6" is illustrated without the folding means 9" inserted, the guide portion 62 of the sliding carriage 6" has, on both sides, in each case two claw-like receptacles 620 and a thrust bearing 621 which are aligned with one another and form a guide 62a for receiving the journal 91a. Here, the guide 62a is one in which the journal 91a is pivotable but in which a movement as in the curved guide 62a of the first exemplary embodiment is not possible. In this respect, the guide 62a of the present exemplary embodiment is restricted to the axial insertion of the journal 91a and the subsequent pivotable mounting of said journal 91a in the guide 62a.

Correspondingly, in each case one recess is formed in the claw-like receptacle 620 and in the thrust bearing 621, which recess has an at least predominantly cylindrical outer contour, with at least one periphery of more than 180° being enclosed preferably by means of the parts 620, 621 of the guide 62a, in order to receive the journal 91a in a stable manner, with preferably at least one of the parts 620, 621 delimiting at least 180° of the periphery of the journal 91a and the claw-like receptacles preferably having only one slot 620a which is required for the passage of the webs 93b when inserting the folding means 9" into the receptacle 62a.

Figure 25:
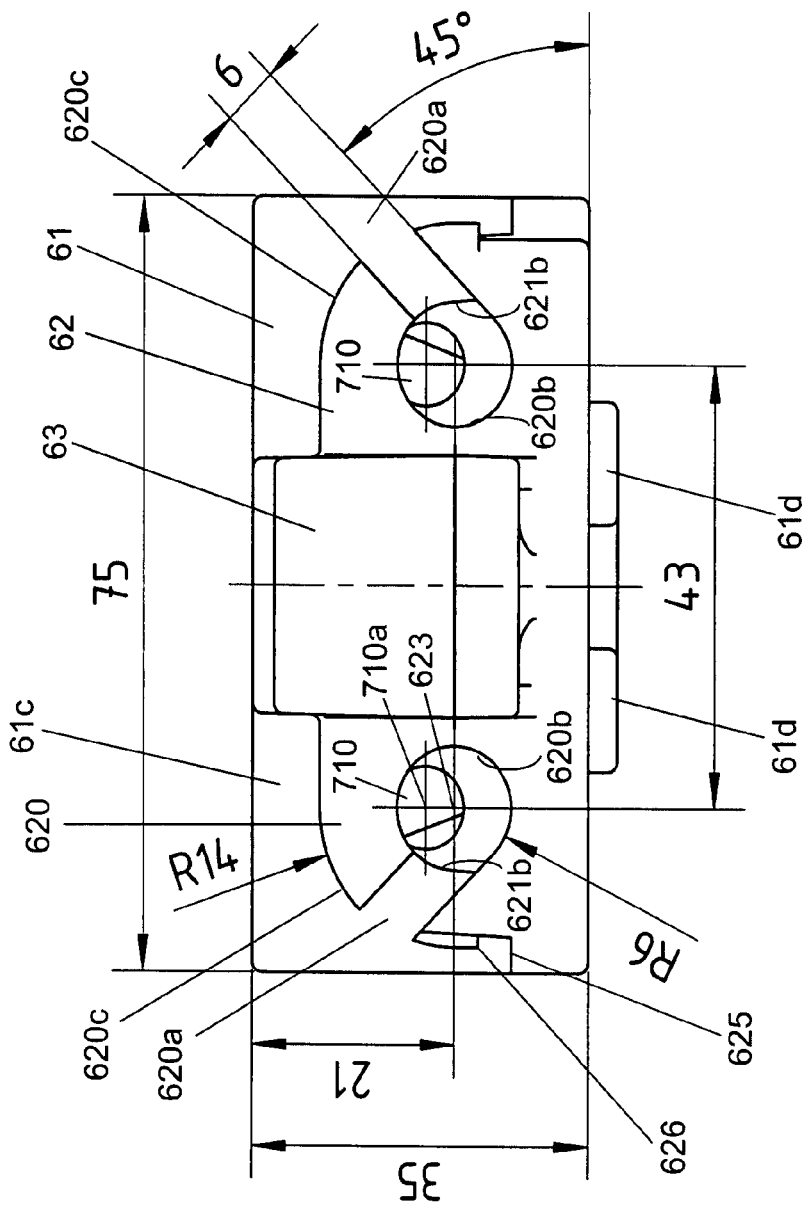
FIG. 25 shows a side view of the slot from FIGS. 20 to 22 from the direction of the bow shaft.
Figure 26:
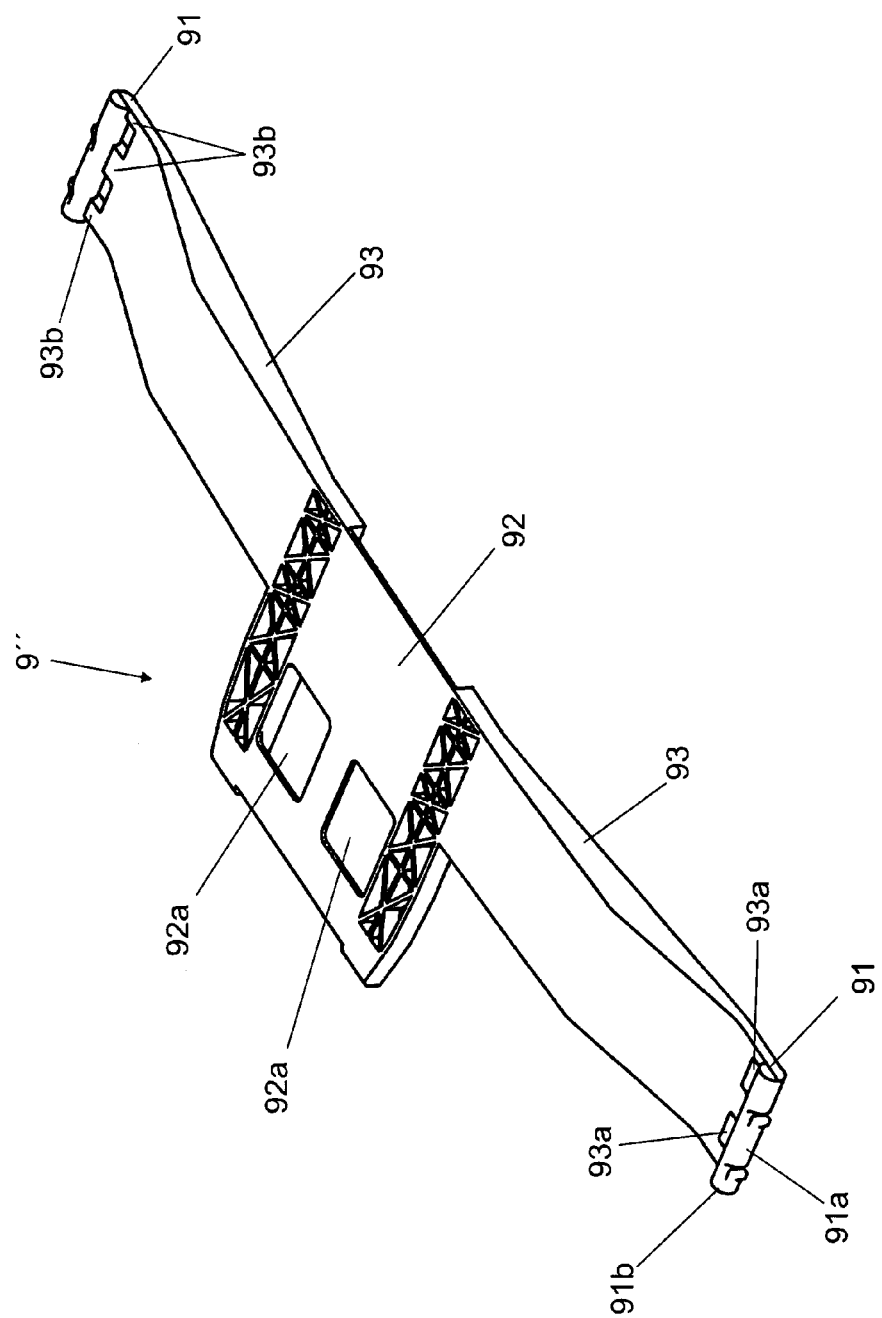
FIG. 26 shows a perspective view of a folding element from a covering frame as per FIGS. 20 and 21.

The slot 620a is expediently arranged such that it permits the insertion of the folding means 9" at an inclination of approximately 45°, such that the slot is aligned in a direction in which the loadings in the direction of the slot 620a by the folding means 9" are particularly low, other than would possibly be the case in the horizontal or in the vertical. FIG. 25 shows an inner contour 620b of the claw-like receptacle 620, and also a part of the inner contour 621b of the thrust bearing 621, and also the bearing journal 710 for the load-bearing roller 71, which bearing journal 710 extends through the limb 61c of the sliding carriage 6". It can be seen that the axis 710a of the bearing journal 710 and the axis 623 of the guide 62a run parallel to one another and, in addition, are slightly offset relative to one another only in height. It can also be seen that the claw-like receptacle 620 is formed in one piece with the remainder of the sliding carriage 6" from plastic, and that the outer contour 620c of the claw-like receptacle 620 is likewise rounded in order to permit a pivoting movement of the folding means 9", with in particular the cutouts 93a being dimensioned here such that they can pivot about the outer contour 620c. It has to be understood that also only one claw-like receptacle 620 can be provided, as well as more than two claw-like receptacles 620, with their width then being reduced in order that it is not necessary to increase the installation length of the bearing portion 62. It further has to be understood that a claw-like receptacle 620 can likewise be provided in the region of the limb 61c instead of the thrust bearing 621, with said rear-most claw-like receptacle then preferably being closed. Finally, it is also possible for the entire guide 62a to be formed by a single claw-like receptacle 620 which largely makes up the width of the bearing portion 62a, with recesses for the latching means 91a then preferably being provided in the inner periphery 620b. In this case, it is preferably possible for one externally accessible opening to be provided in the claw-like receptacle 620 to the latching means, in order to shear said latching means off if a folding means 9" is to be released from the sliding carriage 6".

It is also possible to form the webs 93b not parallel to one another but rather to provide an angular offset if the angles of the slots 620a of the claw-like receptacle 620 are likewise offset with respect to one another, as a result of which a stepped pivoting movement must also be performed at the same time as the axial insertion of the end region 91 of the folding means 9".

Figure 29:
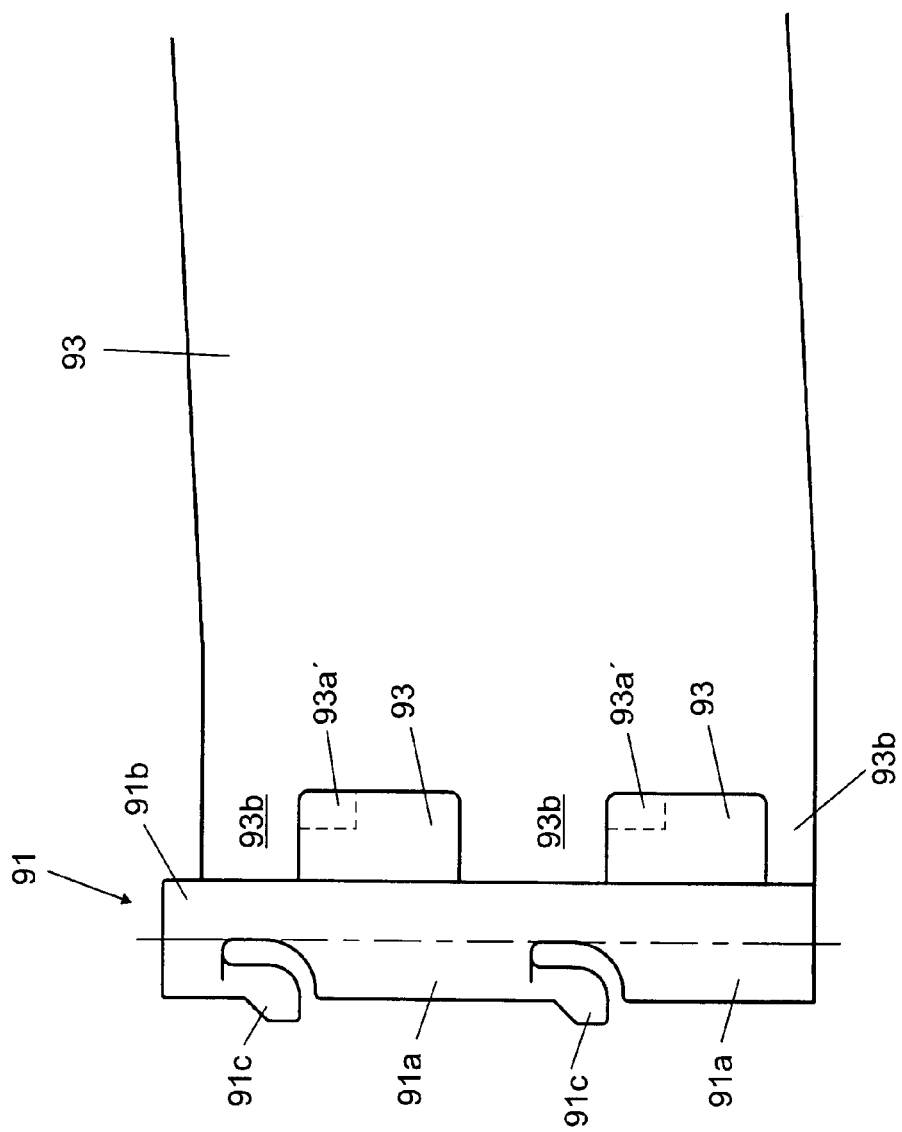
FIG. 29 shows a plan view of an enlarged detail of the folding element as per FIG. 26 from below.

A horizontal rest face 625 is provided on the sliding carriage 6", in the present case on the claw-like receptacles 620, which horizontal rest face 625 can form a stop for the folding means 9" precisely when a step 93a' is provided in its cutout 93a, as illustrated in FIG. 29. Said step 93a' comes to rest on the rest face 625 and prevents an inadvertent pivoting of the folding means 9" downward beyond a horizontal position. It can be seen in FIG. 23 that the width in the direction of the bow axis of the rest face 625 makes up slightly less than half, in any case only a fraction, of the width of the claw-like receptacle 620, and that the step 93a' is substantially adapted to the width of the rest face 625. It is hereby possible, by means of a further, laterally offset portion of the sliding carriage 6" or of the claw-like receptacle 620, to form a mating face 626 which is substantially parallel to and spaced apart from the rest 625, which mating face 626 makes it possible to clamp an object, in particular a leaf spring, between the two faces 625, 626 for the case that a part which is pivotably mounted in the claw-like receptacle 620 should be preloaded.

In addition, the body of the guide portion 62 forms a stop for the folding means 9" at approximately 110°, so that a fold-over is also not to be feared here.

If the end portion 91a of a folding means 9" is now inserted into the guide 62a from the direction of the bow shaft 21 in the direction of the longitudinal member 4", which preferably takes place before the connection of the plug-in portion 63 to the bow shaft 21, the movement of the latching means 91c past the claw-like receptacles 620 leads to the latching means 91c being compressed, which latching means 91c spring back into their set-out position on account of their residual stress. When the journal 91a is completely inserted, in which case the projection 91b of the journal 91a is pushed into the thrust bearing 621, the latching means 91c spring out and, with their region which projects beyond the periphery of the journal 91a, come into contact against the in each case outwardly-pointing end wall of the claw-like receptacle 620, as a result of which a retraction on account of the form fit which is thereby created is not possible. The latching means 91c are practically not loaded by the pivoting movement of the folding means 9" and the movement of the sliding carriage 6", so that said latching means 91c can be of small dimensions. The guide 62a permits a pivoting of the journal 91a, so that the folding means 9" are directly set upright, and push the roof tarpaulin upward, as the bows 8 are pushed together. On account of the locking by the latching means 91c, it is not necessary to close off the entry region, which points toward the bow shaft 21, into the guide 62a by means of the bow shaft 21 or some other part. It is thereby advantageously possible to insert new folding means 9" into the guide 62a even without releasing the bow shaft 21 from the plug-in section 63.

The invention has been explained above on the basis of three exemplary embodiments, with the sliding carriages 6 and 6' substantially having the bearing portion 62 designed in the same way, and the sliding carriages 6 and 6" substantially having the load-bearing region 61 designed identically. It has to be understood that it is directly possible to design a sliding carriage such that the load-bearing region of the sliding carriage 6' is combined with the guide region of the sliding carriage 6", or else to combine the constituent parts of the various sliding carriages with one another in some other expedient way. It has to be understood that regions of the sliding carriage can also be provided which deviate from the exemplary embodiments, which regions are adapted to the relevant folding means and/or to the relevant longitudinal members.

It finally has to be understood that the method described above for assembling a folding means on a sliding carriage by means of axially inserting the end region of the folding means into the guide of the sliding carriage, and fixing said folding means in the guide of the sliding carriage in a form-fitting manner, have technical and economical advantages which the prior art does not provide.

The invention claimed is:

1. A covering frame for a tarpaulin structure, comprising a plurality of bows which can be moved along lateral longitudinal members and which have at their two ends in each case one sliding carriage,
   wherein a folding element is arranged in the region of the at least one sliding carriage for positive folding of a tarpaulin,
   wherein the folding element comprises a journal, an end portion of the folding element extending radially from the journal, and wherein the at least one sliding carriage comprises a guide, the guide having an aperture for the passage of the end portion of the folding element, such that the journal and the end portion of the folding element can be inserted into the guide by being commonly axially displaced.

2. The covering frame as claimed in claim 1, wherein the guide comprises a thrust bearing in a wall of the at least one sliding carriage, which thrust bearing is closed at least in the upward direction.

3. The covering frame as claimed in claim 1, wherein the at least one sliding carriage comprises a rest face which prevents the folding element from pivoting below a horizontal plane.

4. The covering frame as claimed in claim 1, wherein the folding element comprises at least one cutout.

5. The covering frame as claimed in claim 1, wherein the guide is delimited by at least one claw-like receptacle, and wherein the aperture for the passage of an end portion of the folding element is provided in said claw-like receptacle.

6. The covering frame as claimed in claim 1, wherein the guide has a substantially cylindrical shape, and wherein the journal and the end portion of the folding element are commonly rotatable in the guide, the guide and the journal defining a pivot axis.

7. The covering frame as claimed in claim 1, wherein the aperture has a width, said width being adapted to a thickness of the folding element close to the end portion of the folding element.

8. The covering frame as claimed in claim 1, wherein the end portion of the folding element has a curved profile, wherein the guide has a curved shape, and wherein the curved profile of the folding element is axially displaceable into the curved guide.

9. The covering frame as claimed in claim 8, wherein the folding element can perform a pivoting movement within the curved guide in order to be set upright.

10. The covering frame as claimed in claim 8, wherein the curved guide has a circular-arc section which runs with a constant radius about a central axis.

11. The covering frame as claimed in claim 1, wherein the folding element has a curved end region, and wherein the journal is embodied as a bead-like thickening.

12. The covering frame as claimed in claim 1, wherein the at least one sliding carriage is respectively provided with two oppositely-situated guides.

13. The covering frame as claimed in claim 1, wherein the sliding carriage is formed from plastic.

14. The covering frame as claimed in claim 1, wherein horizontally-mounted load-bearing rollers and at least one vertically-mounted guide roller are provided on the at least one sliding carriage, and wherein an upper end side of the at least one guide roller is situated lower than an upper edge of the load-bearing rollers.

15. The covering frame as claimed in claim 14, wherein a lower end side of the at least one guide roller is situated in a plane above the rotational axis of the load-bearing rollers.

16. The covering frame as claimed in claim 1, wherein the at least one sliding carriage can be placed at an end side onto a bow shaft, wherein horizontal load-bearing elements and vertical guide elements are provided on said at least one sliding carriage, and wherein a projection is provided as an anti-tilt device on said at least one sliding carriage, wherein the projection faces said longitudinal member.

17. The covering frame as claimed in claim 16, wherein the projection protrudes into a C-shaped chamber of the longitudinal member, an upper limb of said chamber preventing said projection from being lifted out.

18. The covering frame as claimed in claim 16, wherein the projection is formed in one piece with the sliding carriage, wherein the load-bearing elements are designed as rollers, and wherein the projection is arranged between two load-bearing rollers.

19. The covering frame as claimed in claim 1, wherein, wherein horizontal load-bearing rollers and vertical guide rollers are provided on said at least one sliding carriage, wherein the load-bearing rollers roll on a first track of the longitudinal member, wherein the first track is arranged at an inner end of the longitudinal member that is freely accessible from the top.

20. The covering frame as claimed in claim 1, further comprising a latching arrangement which prevents the folding element from axially sliding out of the guide.

21. The covering frame as claimed in claim 20, wherein the latching arrangement is formed as bent-out portion of the end portion of the folding element which engages behind a face of the guide, the latching arrangement being preloaded in a locking direction.

22. The covering frame as claimed in claim 1, wherein the folding element, as it is pivoted up, also has an movement component perpendicular to the longitudinal member, such that a tarpaulin resting on the folding element carries out a movement away from the longitudinal member.

23. The covering frame as claimed in claim 1, wherein the folding element comprises a central lifting member, the central lifting member being connected to outer sections of the folding element by means of a predetermined bending line, wherein a journal is provided at two ends of the folding element, such that the central lifting member, as the bows are pushed together, forms a contact face for lifting a roof tarpaulin.

24. The covering frame as claimed in claim 23, wherein the central lifting member can be disposed above the longitudinal member.

25. The covering frame as claimed in claim 1, wherein the guide is arranged below an upper edge of the longitudinal member.

26. The covering frame as claimed in claim 1, wherein the longitudinal member comprises a first limb and a second limb, wherein the first limb is arranged substantially vertically downward, wherein the second limb is arranged substantially horizontally, wherein the first limb comprises an inwardly-pointing sliding track for a load-bearing element of the at least one sliding carriage, and wherein a C-shaped profile section being open toward the sliding track is provided adjacent to the sliding track, wherein the inwardly-pointing sliding track is freely accessible from an upward direction.

27. A longitudinal member for use in a covering frame for a tarpaulin superstructure, a sliding carriage of the covering frame displaceably connecting a bow to the longitudinal member, the longitudinal member comprising:

a first, substantially horizontally arranged limb, and a second limb which is arranged substantially vertically downward, wherein the first limb has an inwardly-pointing sliding track for contacting a load-bearing element of a sliding carriage, wherein a C-shaped profile section which is open toward the sliding track is provided adjacent to the sliding track, and wherein the inwardly-pointing sliding track is freely accessible from an upward direction.

28. The longitudinal member as claimed in claim 27, wherein a base of the C-shaped profile section is formed so as to be elevated in relation to the sliding track.

29. The longitudinal member as claimed in claim 27, wherein an upwardly-open chamber is formed on a side of the C-shaped profile section which faces away from the sliding track, in which chamber can be inserted a guide element of the sliding carriage.

30. The longitudinal member profile as claimed in claim 29, wherein the base of the upwardly-open chamber is situated below a bisector of the C-shaped profile section, and wherein a lower edge of an upper, substantially horizontal limb of the C-shaped profile section is situated above a bisector of the upwardly-open chamber.

31. The longitudinal member profile as claimed in claim 29, wherein an upper delimitation of the first limb is formed so as to slope downward between the upwardly-open chamber and an outer edge, and wherein at least one closed hollow chamber is formed below the downward-sloping region.

32. The longitudinal member profile as claimed in claim 27, wherein the longitudinal member is composed of one of extruded aluminum and of steel.

33. A telescopic roof system for removably disposing a tarpaulin in a roof region of a utility vehicle superstructure, comprising
two parallel longitudinal beams;
a plurality of bows displaceable along said longitudinal beams by means of a sliding carriage provided at each end of each bow;
a folding element arranged between adjacent bows, each folding element having two end portions, each end portion being received in a guide provided in the sliding carriage, the folding elements effectuating a folding of the tarpaulin when the bows are pushed together,
wherein the guide comprises a bearing with a radial aperture for pivotably accommodating the end portion of the folding element,
wherein the end portion of the folding element can be inserted into the bearing and the aperture.

34. The system according to claim 33, wherein the guide is provided in at least one claw-like receptacle, and wherein the aperture for the passage of the end portion of the folding element is provided in said claw-like receptacle.

35. The system according to claim 33, wherein the guide is arranged lower than a central portion of the folding element can be deposited on the beam, and wherein the axis of the guide is arranged substantially parallel to an axis of the respective bow.

36. The system according to claim 33, wherein the sliding carriage comprises:
a coupling section for the bow,
at least one load-bearing element, and
at least one guide element.

37. The system according to claim 36, the sliding carriage comprising a projection as an anti-tilt device, said projection protruding beyond the at least one load-bearing element and facing the longitudinal beam.

38. The system according to claim 37, wherein the at least one load-bearing element comprises a load-bearing roller rotatable about a horizontal axis, wherein the load-bearing roller is disposed to contact a sliding track of the longitudinal beam while the projection is disposed to engage a C-shaped profile section being open toward said sliding track, wherein the sliding track is lower than a base of the C-shaped profile section, and wherein the projection keeps a distance from the base of the C-shaped profile section.

39. The system according to claim 38, wherein the at least one guide element is a guide roller rotatable about a vertical axis, wherein an upper end side of the guide roller is arranged lower than an upper edge of the load-bearing roller, wherein a lower end side of the guide roller is situated in a plane above the rotational axis of the load-bearing roller.

* * * * *